(12) United States Patent
Shanmugam et al.

(10) Patent No.: US 9,990,659 B2
(45) Date of Patent: Jun. 5, 2018

(54) IN-STORE SELF-SERVE AND ZONING USING GEO-FENCING

(71) Applicant: Cellco Partnership, Basking Ridge, NJ (US)

(72) Inventors: Sankar Shanmugam, Dayton, NJ (US); Shan Olachery, Branchburg, NJ (US); Arindam Mitra, Duluth, GA (US); Daniel M. Rivera, Monroe, NY (US); Matthew Farley Reeves, Budd Lake, NJ (US); Lapfan Lam, Summit, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 711 days.

(21) Appl. No.: 14/288,900

(22) Filed: May 28, 2014

(65) Prior Publication Data
US 2015/0348146 A1 Dec. 3, 2015

(51) Int. Cl.
| | |
|---|---|
| *G06Q 20/32* | (2012.01) |
| *G06Q 30/06* | (2012.01) |
| *H04W 4/02* | (2018.01) |
| *H04M 1/725* | (2006.01) |
| *G06Q 10/10* | (2012.01) |
| *G06Q 20/38* | (2012.01) |

(52) U.S. Cl.
CPC ..... *G06Q 30/0603* (2013.01); *G06Q 10/1095* (2013.01); *G06Q 20/3224* (2013.01); *G06Q 20/3829* (2013.01); *H04M 1/72577* (2013.01); *H04W 4/021* (2013.01)

(58) Field of Classification Search
CPC .......................... G06Q 20/3224; H04W 4/021

USPC ....................................... 705/26.1, 26.7, 27.1
See application file for complete search history.

(56) References Cited

U.S. PATENT DOCUMENTS

| | | | | |
|---|---|---|---|---|
| 9,351,193 | B2 * | 5/2016 | Raleigh | ................ H04M 15/80 |
| 2008/0189170 | A1 | 8/2008 | Ramachandra | |
| 2008/0301057 | A1 * | 12/2008 | Oren | ...................... G06F 21/31 |
| | | | | 705/71 |

(Continued)

FOREIGN PATENT DOCUMENTS

WO    WO2009091553 A1    7/2009

OTHER PUBLICATIONS

Moors, T., Mei, M. & Salim, A. Pers Ubiquit Comput (2008) 12:11. doi:10.1007/s00779-006-0124-1.*

(Continued)

*Primary Examiner* — M. Thein
*Assistant Examiner* — Michelle T Kringen

(57) ABSTRACT

A geo-fencing system includes a plurality of beacons defining zones within a venue. The system receives a first beacon identifier from a mobile device and registers the mobile device in a first zone corresponding to the first beacon. The system causes a first menu to be displayed on the mobile device, indicating options for the first zone. In response to selection of one of the options, the system registers the mobile device as being active in the first zone. The system then receives a second beacon identifier and registers the mobile device as being in the second zone. The system also suspends the activity of the mobile device in the first zone and causes options to be displayed to continue or terminate the activity in the first zone.

19 Claims, 33 Drawing Sheets

(56) References Cited

U.S. PATENT DOCUMENTS

| | | | |
|---|---|---|---|
| 2009/0298505 A1* | 12/2009 | Drane | H04W 4/02 455/446 |
| 2010/0049594 A1 | 2/2010 | Bonner et al. | |
| 2011/0028093 A1 | 2/2011 | Patel et al. | |
| 2011/0060652 A1 | 3/2011 | Morton | |
| 2011/0112892 A1 | 5/2011 | Tarantino | |
| 2011/0119132 A1* | 5/2011 | Morton | G06Q 30/02 705/14.53 |
| 2012/0072861 A1 | 3/2012 | Tuli et al. | |
| 2012/0182172 A1 | 7/2012 | Sorensen | |
| 2012/0310827 A1* | 12/2012 | Gibson, III | G06Q 20/10 705/42 |
| 2015/0065177 A1* | 3/2015 | Phillips | G08B 21/0236 455/456.3 |
| 2015/0066519 A1* | 3/2015 | Lin | G06Q 50/10 705/1.1 |

OTHER PUBLICATIONS

Bluetooth SIG Inc., "Bluetooth Specification—Proximity Profile", pp. 1-21, 2001.
Bluetooth SIG Inc., "Bluetooth Specification—Alert Notification Profile", pp. 1-19, 2011.

* cited by examiner

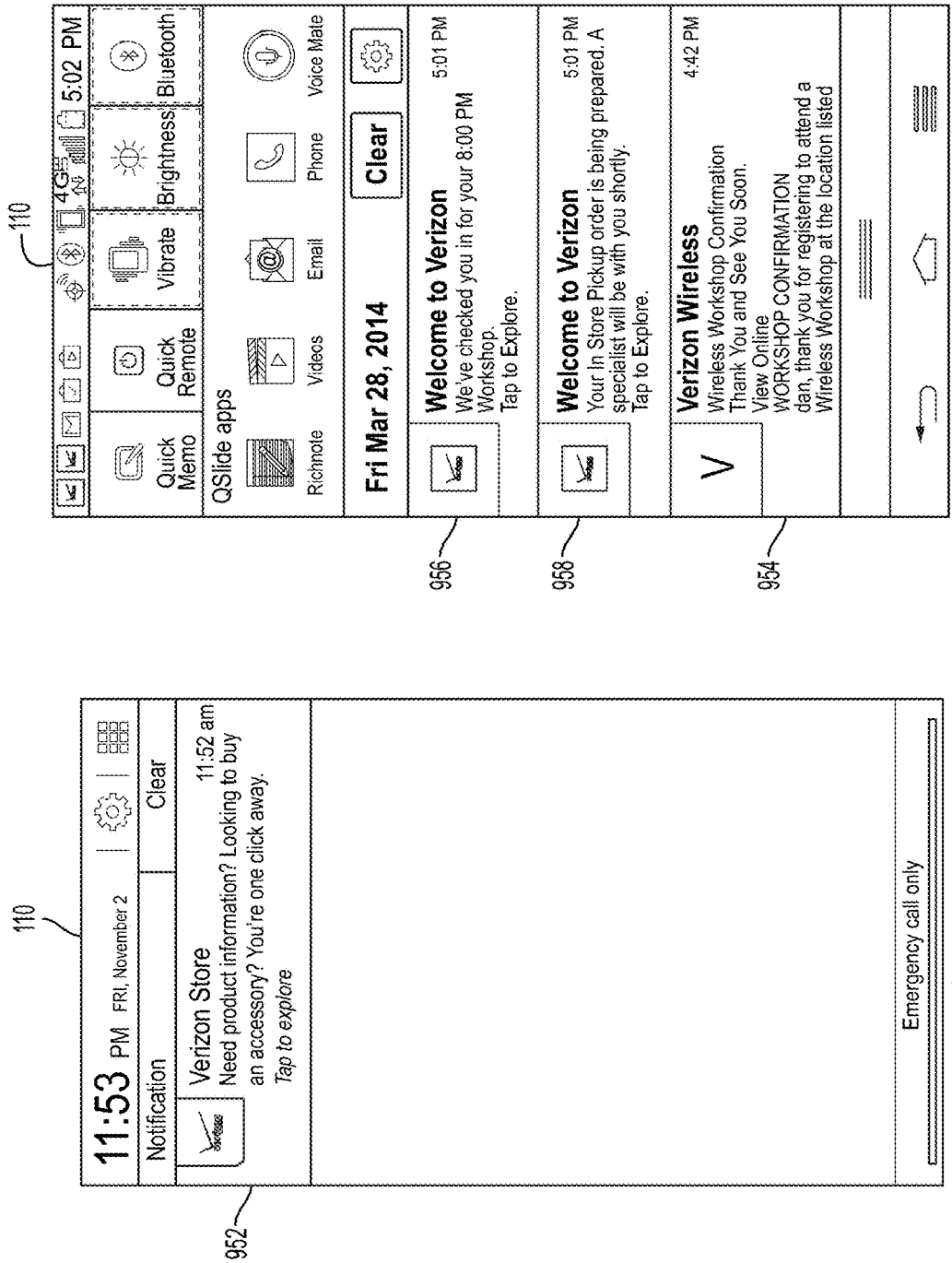

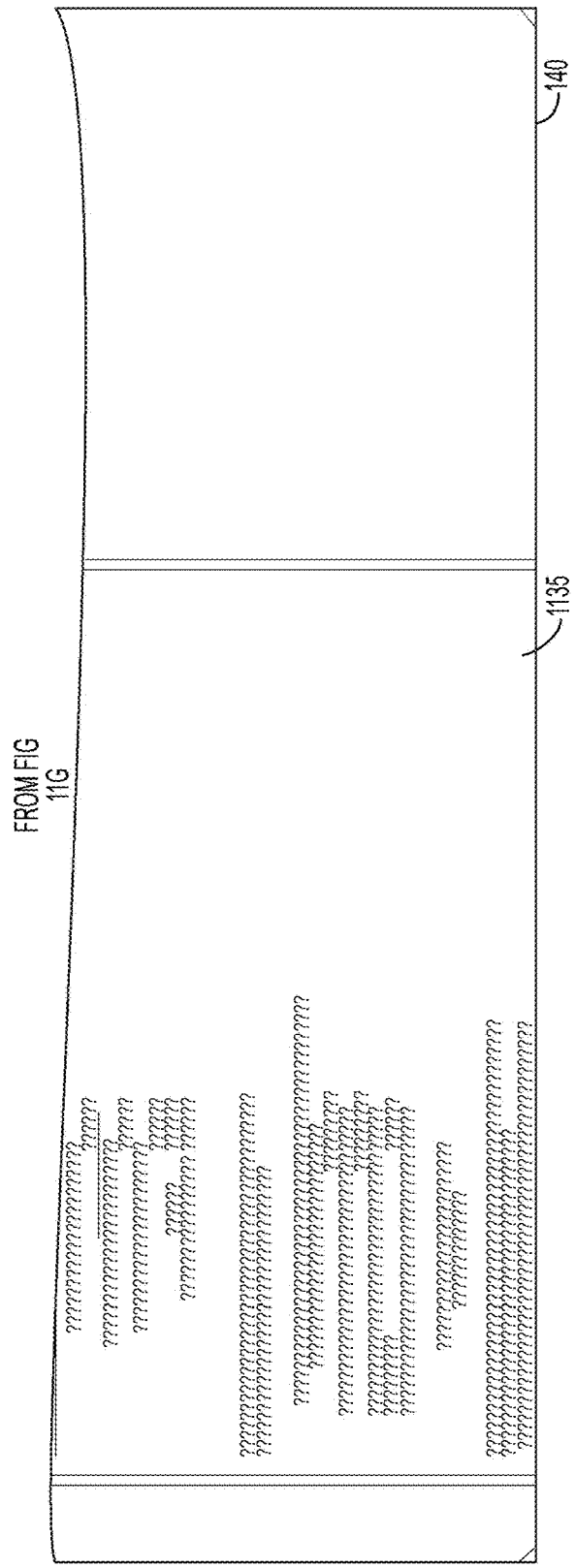

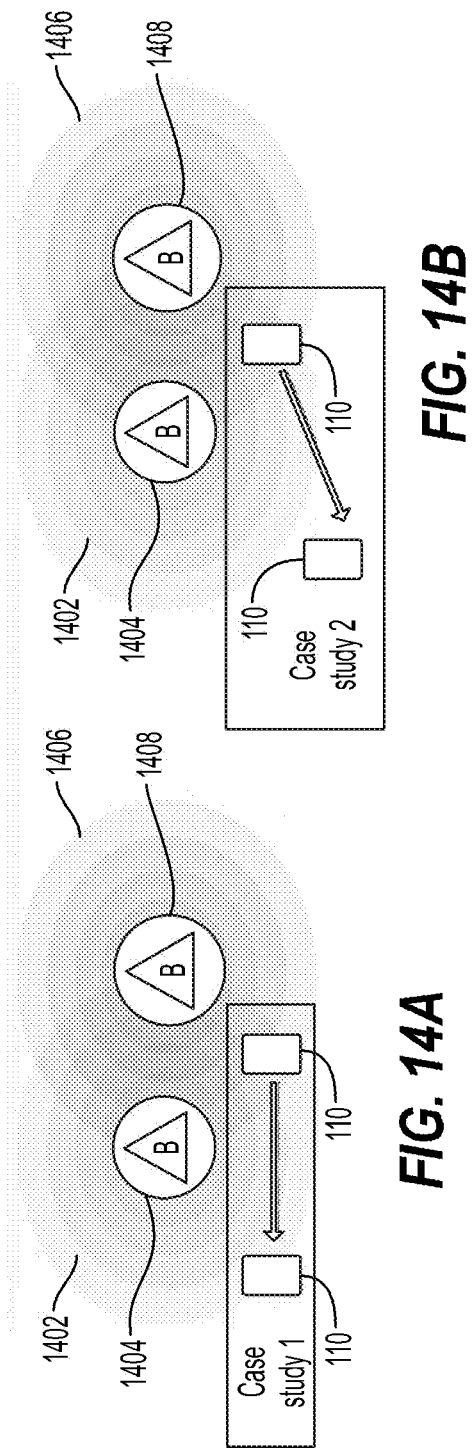

IN-STORE SELF-SERVE AND ZONING USING GEO-FENCING

BACKGROUND

On line shopping is now commonplace and increasingly users shop using their mobile devices. A variety of online shopping services are available and more are being proposed. One approach to on-line shopping presents the customer with a group of linked web pages about products or services of one or more sellers. These pages may also offer one or more search options to help the user navigate through the various pages to the page about the item of current interest to the particular shopper. A shopper may select an item for purchase and pay for it by sending credit card information using a secure web page.

The shopping experience at conventional brick-and-mortar stores, however, is largely unchanged. Customers enter the store and need to search the store for a particular product. If customers need assistance, they must find a salesperson or customer service representative and often wait for them to finish serving another customer. This is the case even if the customer has a quick question that the representative could answer while continuing to serve the other customer. Furthermore, to purchase a product, the customer must find the product in the store, take it to a sales person, wait while the salesperson enters the information into a point-of-sale terminal, present payment and wait for the payment to be processed.

With increasing automation and decreasing profit margins, it is common for retail stores to reduce the number of salespersons and customer service representatives on duty at any given time. This makes it more difficult for customers to shop, increasing their frustration levels.

Mobile devices may be used to enhance the shoppers experience in a conventional retail store. For example, they may be used, for example, to obtain coupons or to obtain and compare prices of products by scanning their universal product code (UPC) barcodes. These uses, however, do not address the problems outlined above.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIGS. 9A, 9B and 9C are screen-shots that show the check-in options described with reference to FIG. 9.

FIGS. 14A and 14B are case study-diagrams that show interaction of the mobile device moving into and out of a zone.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

Figure 1:
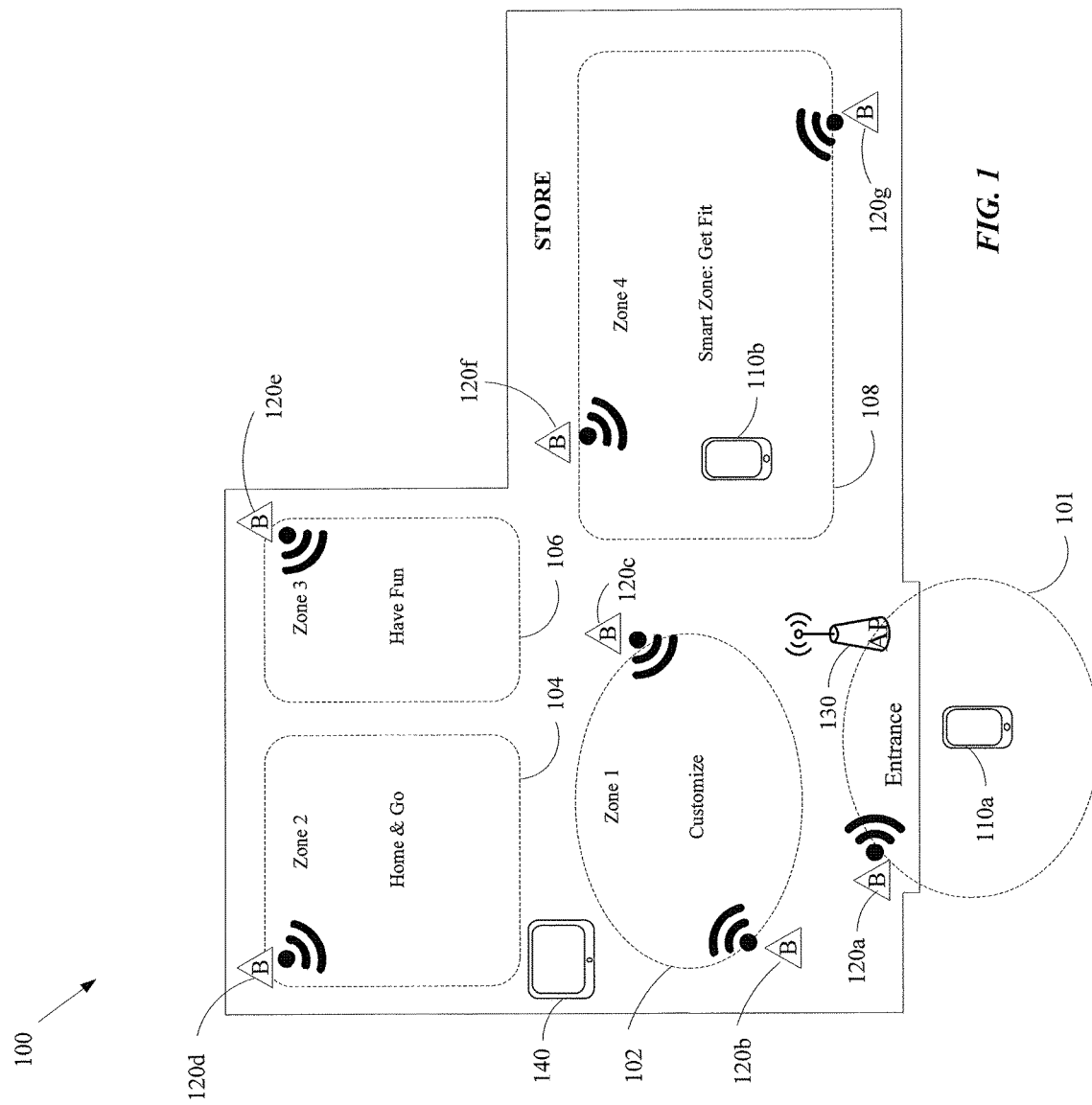
FIG. 1 is a top plan view of a store that is useful for describing a mobile-enhanced retail shopping experience.

FIG. 1 illustrates a retail store including a plurality of zones. The example store 100 is a mobile device store where users may purchase, customize and accessorize mobile devices, such as smartphones or tablet computers. This example is not limiting. It is contemplated that the invention may be used in other retail environments or in other venues where customers or other users obtain goods, information and/or services, for example, in a restaurant, the emergency room of a hospital or a government service facility such as the Department of Motor Vehicles. Although the zones are shown as being defined along a single horizontal plane, it is contemplated that they may be defined in three-dimensions, either on a single floor or on multiple floors of a venue. In addition, although the materials below refer to a customer or customers, it is contemplated that they apply to users of services generally, even though these users may not be classified as customers.

The example store 100 includes four zones, a customize zone 102, in which customers may customize their smartphones. A home and go zone 104 where customers may purchase products to enhance the functionality of their devices at home and in transit. A have-fun zone 106 where customers may purchase games or gaming accessories for their devices. And a get fit zone 108 where customers may purchase fitness applications and accessories. In the store, the zones may be indicated by signage identifying each zone. The signage may centrally located above the zone or it may be placed on or adjacent to aisles or counters in the zone.

Each of the zones is delimited by one or more beacons 120 that establish a geo-fence delimiting the zone. Each beacon 120 transmits a signal including a unique beacon identifier (beacon ID). The example beacons are short-range transmitters, for example Bluetooth®, Bluetooth Low Energy (BLE) or near field communication (NFC) devices. It is contemplated, however, that other types of low-power radio frequency (RF) transmitters may be used. It is also contemplated that low-power transmitters using other technologies, such as infrared or ultrasonic may be used. The signals transmitted by the BLE devices, for example, have a range of about 20 meters or less and may be directed, using directional antennas or radio frequency (RF) shielding, toward a particular area. At the boundaries between zones, the beacon signals that define respective zones may overlap. When a mobile device detects multiple beacons belonging to different zones, it defines its current zone by the strongest beacon signal. To prevent repetitive switching at a zone boundary, hysteresis may be added to the switching algorithm so that a switch from a current zone to a new zone does not occur until the sensed power of the beacon from the new zone exceeds the power of the beacon from the current zone by more than a threshold. This threshold may be a percentage, for example, between 5% and 20% of the power of the beacon defining the current zone.

As the customer moves through the store, the mobile device 110 sends a message to a geo-fencing application running on a remote application server (not shown in FIG. 1) indicating zone changes. The geo-fencing application on the application server keeps track of these zone changes in information records about each of the customers that are currently logged in. The geo-fencing application also keeps track of the customer's activity in the zone. For example, the geo-fencing application may have a data record for each customer and register, in that record, 1) the current zone for the user and 2) whether the customer has initiated an activity in the zone. The geo-fencing application may also send the zone-change information to point-of-sale (POS) terminals 140 used by customer representatives in the store.

In the example shown in FIG. 1, zone 1 is delimited by beacons 120b and 120c, zone 2 is delimited by beacon 120d, zone 3 is delimited by beacon 120e and zone 4 is delimited by beacons 120e and 120f. The beacons 120 and zones are used to implement the geo-fencing application on the remote application server and corresponding applications on mobile devices 110 used by customers and the POS terminals 140 used by the customer representatives. As described below, these applications allow mobile users to enhance their shopping experience in the store 100.

The three interacting applications may be considered to be three portions of a single geo-fencing application, a server portion, running on the application server, a customer portion running on a mobile device 110 and a POS portion running on the POS terminal 140. The three applications interact to implement a geo-fencing environment as described below.

In addition to the beacons defining the zones, the store 100 includes a beacon 120a near the entrance of the store and, optionally, an access point 130 also covering the entrance to the store. The beacon 120a and/or access point 130 may be used to identify the store to the mobile device 110 before the customer enters the store and to facilitate check in of the application on the mobile device 110 to the geo-fencing application running on the remote server. The beacon 120a and/or access point 130 may be used to define an entrance zone. The signals from these devices, however, are more powerful than the signals of the beacons delimiting the zones internal to the store. These more powerful signals extend outside of the store 100 so that, as customers approach or walk-by the store, the mobile device senses the signal defining the entrance zone and either welcomes the customer or logs the customer into the geo-fencing, as described below.

Because it has a greater range, it may be desirable to use the Wi-Fi signal of the access point 130 to identify the entrance zone. Not all mobile devices 110, however, can receive a Wi-Fi signal, for example, if Wi-Fi communications are not enabled. Thus, the example embodiments include both Wi-Fi access point 130 and beacon 120a to define the entrance zone.

Briefly, upon approaching or entering the store 100, the mobile device 110 manually or automatically checks in to the geo-fencing application. An automatic check-in occurs when the geo-fencing application determines that the customer has previously-arranged business, such as an appointment, a workshop or product pick-up in the store. Where the customer does not have any previously arranged business, the geo-fencing application causes a welcome message to be displayed on the mobile device inviting the customer to manually log-in to the application.

As the customer traverses the store, the geo-fencing application recognizes the customer's position based on beacon signals received by the mobile device and transmitted to the remote server. The geo-fencing application on the server registers each zone change for the mobile device and presents the customer with a menu of activities, items or offers customized for the particular zone currently occupied by the user. In addition to receiving the catalog and offers, the user may automatically check into the geo-fencing application in order to attend a previously-scheduled workshop, keep a previously scheduled appointment or pick up an item that was previously purchased on-line. The customer may also manually check in to the application to request assistance from a customer representative, sign up for a workshop or purchase a product off the shelf. When the customer has signed-up for a workshop or made an appointment, the geo-fencing application 215 causes a notification to be sent to the mobile device 110 a predetermined amount of time, for example 30 minutes, before the event to remind the customer of the event. This time period can be set by the store and be uniform for each attendee and event or dependent on the event (e.g., notifications for different events may be sent at different time periods), or customized by the user. In one embodiment, once the customer is in the store, no additional notifications are presented.

The geo-fencing application may also send a reminder a customer who has previously requested a workshop but who is not in or near the store. This reminder may be sent, for example as an short messaging service (SMS) message. A single message or multiple messages may be sent, for example 24 hours, two hours and 30 minutes before the start of the workshop. Whether such messages are sent and the timing of any such messages may be controlled by the particular store or may be uniform across multiple stores. Whether these messages are sent and the timing of the messages may also be controlled by the customer.

Each customer representative has access to a POS terminal 140 which is also linked to the geo-fencing application on the remote server. In the examples described herein, the POS terminal 140 is a mobile terminal, implemented on a tablet computer. It is contemplated, however, that the POS terminal may not be a mobile device or may be a different type of mobile device, such as a smartphone, that can communicate with the geo-fencing application running on the remote server. As described below the POS terminal 140 lists the shoppers who are in or near the store 100 and who have checked in to the application and need attention of a customer representative and may indicate the zone in which the customer may currently be found. There are several options for notifying customer service representatives of a customer requesting service. For example, geo-fencing application on the application server may send a message the POS terminal of a customer representative who is currently not serving a customer, who is closest to the zone and/or who has special knowledge of the zone to alert the representative that the customer is waiting. Alternatively, all POS terminals 140 may display a list of all customers, in the order that they checked in or requested services so that each customer is handled in turn by the first available representative. This allows the customer representatives to better prioritize their time. The POS terminal 140 may also communicate with the geo-fencing application to display a receipt for an item as the item purchased by a customer in the store, reducing the time to complete the transaction.

The geo-fencing application may also record the activity of customers in the store, for example, how long a customer has been present in a particular zone, which product barcodes were scanned (in order to view product details), whether the customers that scanned the barcodes actually purchased the products and how much time each customer spent in the store. This information may be stored in a database coupled to the geo-fencing application containing information about the store.

Figure 2:
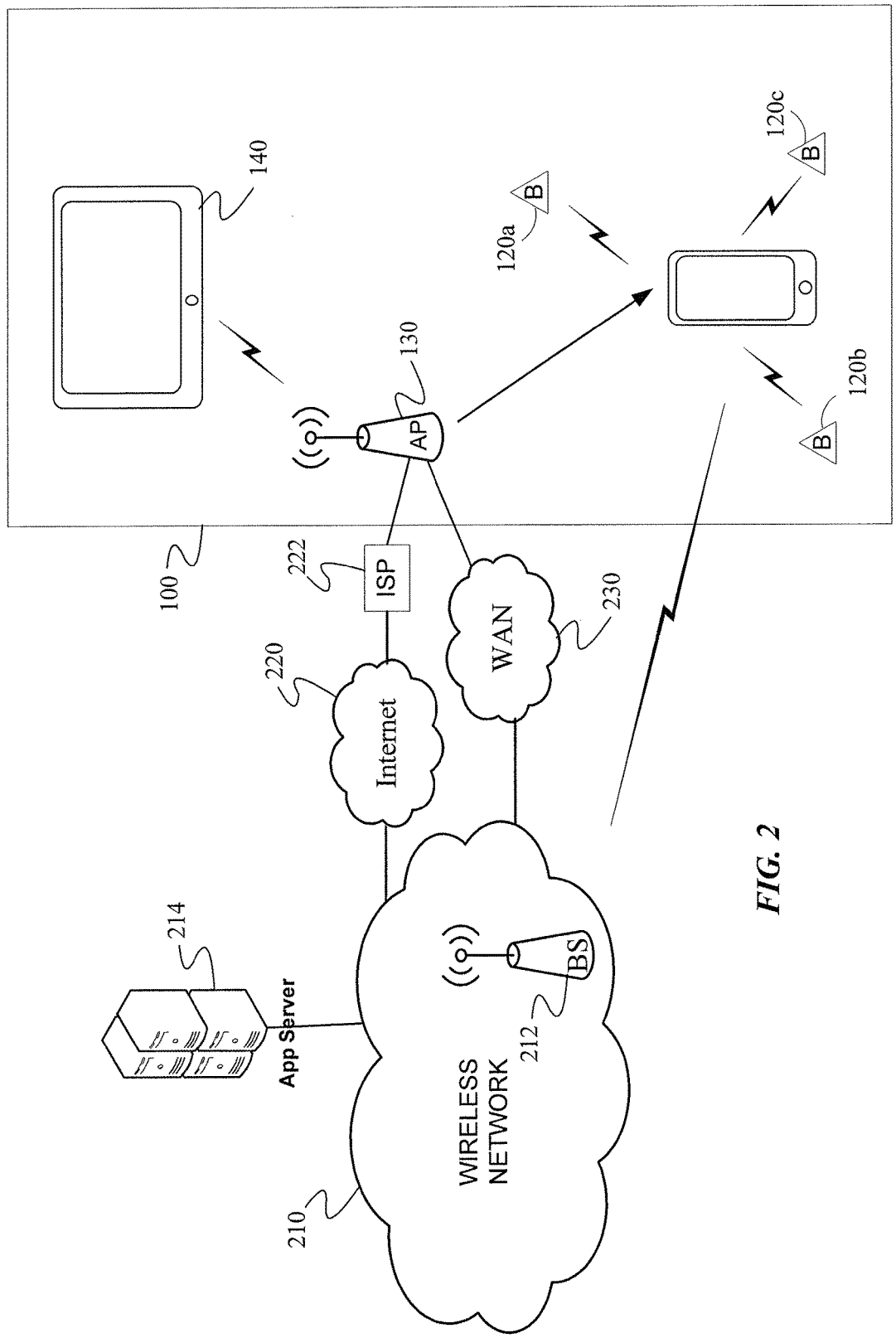
FIG. 2 is network diagram illustrating communication protocols used by the mobile device and the equipment in the store shown in FIG. 1.

FIG. 2 is a block diagram which illustrates an example of the communication protocols used by the devices shown in FIG. 1. FIG. 2 includes a wireless network 210 including a base station 212 and an application server 214. The retail store 100 is shown as including a mobile device 110, three beacons, 120a, 120b and 120c, an access point 130 and a mobile POS terminal 140. FIG. 2 also includes an Internet® service provider (ISP) 222 and a global information network (e.g. the Internet) 220 and an optional wide area network (WAN) 230. The ISP 222, WAN 230 and access point 130 define a wireless local area network (WLAN).

In the store, the mobile device 110 receives signals directly from the beacons 120. It may also receive an advertisement message from the access point 130 including the media access layer identifier (MAC-ID) of the access point. In this example, however, the mobile device 110 does not establish a connection with the access point 130. Instead, the device 110 communicates with the application server 214 via the base station 212 of the wireless network 210. Thus, in this example, the MAC-ID of the access point is another beacon ID which is used to define the entrance zone 101.

The point of sale terminal 140, however, uses the access point 130 to communicate with the application server 214. Access point 130 may be configured to allow the point of sale terminal 140 to communicate with the application server 214 via the WLAN, that is to say either via the ISP 222 and the Internet 220 or via WAN 230. As described below with reference to FIG. 13, the point of sale terminal 140 may also transmit signals to and receive signals from the beacons 120 to set up or reconfigure the beacons.

Figure 3:
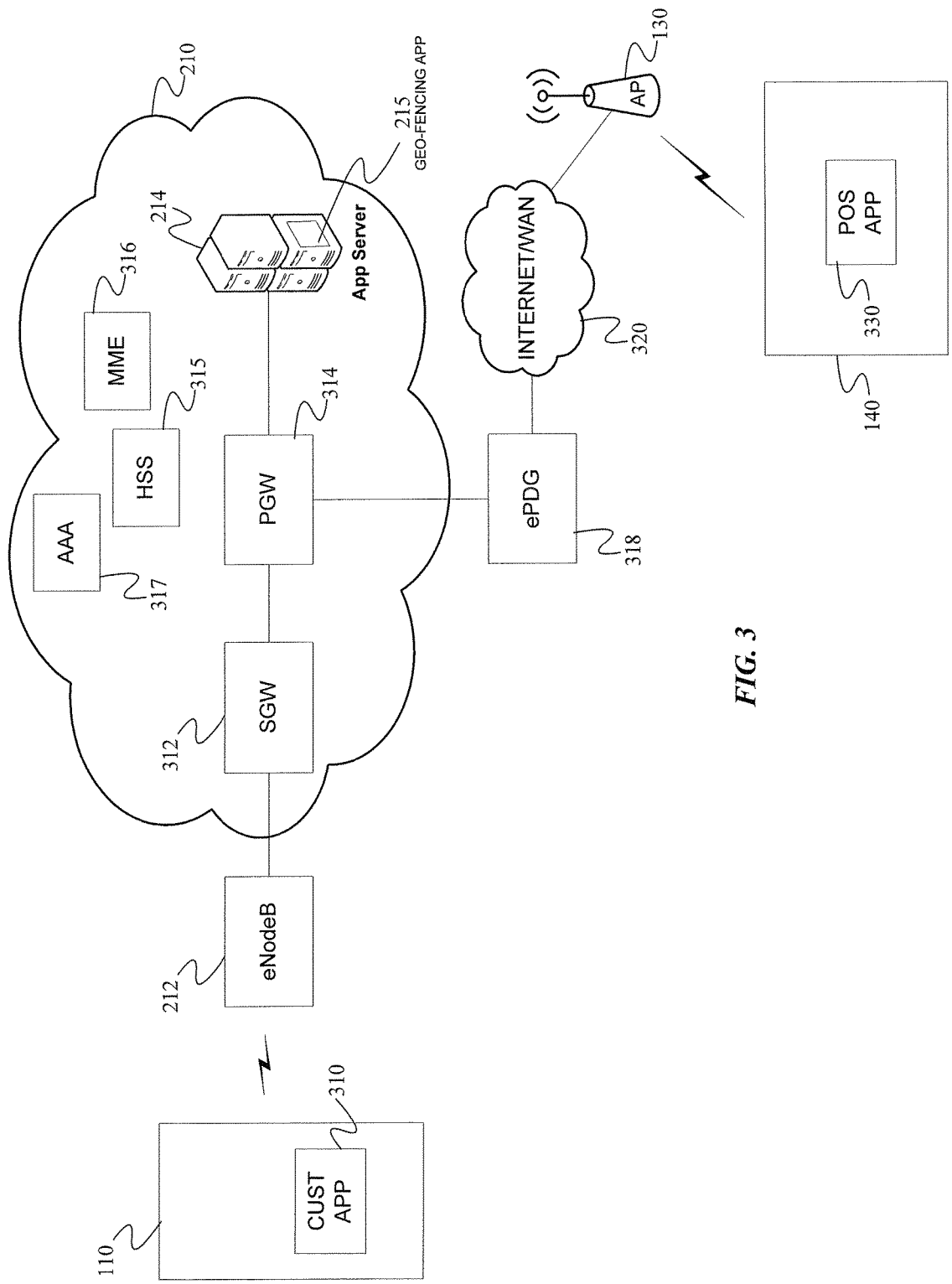
FIG. 3 shows an example network that may be used to implement the communication protocols shown in FIG. 2.

FIG. 3 is a block diagram illustrating one example network configuration for the wireless network 210. The example shown in FIG. 2 is a long term evolution (LTE) network. Although FIG. 2 shows an LTE network, it is contemplated that the mobile device 110 may communicate with the application server 214 using a variety of networks including global system for mobile communications (GSM), universe when mobile telecommunication system (UMTS), wide band code division multiple access (WCDMA), ultra mobile broad band (UMB), high speed packet access (HPSA) worldwide interoperability for microwave access (WIMAX) evolution data optimized (EV-DO) and/or any other type of wireless network.

In the example shown in FIG. 3, the customer geo-fencing application 310 running on the mobile devices 110 communicates with an evolved node B, (eNB) 212. The eNB in turn sends and receives the packets of data to/from the service gateway (SGW) 312. A packet data network gateway (PGW) 314 transfers packet data between the SGW 312 and the application server 214, which includes the server geo-fencing application 215. The communication network 210 further includes a mobility management entity (MME) 316 that is coupled to a home subscriber server (HSS) 315 and an authentication authorization and accounting (AAA) server 317 to provide user profiles and authorization, authentication and accounting services for the mobile devices 110 coupled to the network 210. The application server 214 hosts the geo-fencing application 215 and may also act as a billing server that charges purchases to a customer's account and/or processes credit card transactions. The example geo-fencing application 215 accesses the MME 316, HSS 315 and AAA server 317 to verify information about a customer having an account with the carrier that controls the communication network 210. As described below with reference to FIG. 11, the application 215 obtains encrypted user-names and passwords from customers and passes this information to the MME to verify the identity of the customer and to allow the customers to charge purchases to their accounts. The geo-fencing application 215 uses the PGW 314 and SGW 312 to communicate with the mobile devices 110 via one or more eNBs 212. It also uses the PGW to communicate with the POS terminals 140 via the ePDG 318 network 320 and access point 130.

In the example shown in FIG. 3, the application server 214 is part of the communications network 210. It is contemplated, however, that it may be separate from the network 210 and may be accessed via another network (e.g., the Internet) via the PGW 314.

The point of sale terminal 140 includes a point of sale geo-fencing application 330 that transfers data to and from the application server 214 via the access point 130, a network 320 and an evolved packet data gateway (EPDG) 318. The EPDG 318, in turn, transfers packet data to and from the application server 214 via the PGW 314. The example network 320 includes either the ISP 222 and Internet 220 or the WAN 230, as shown in FIG. 2.

Figure 4:
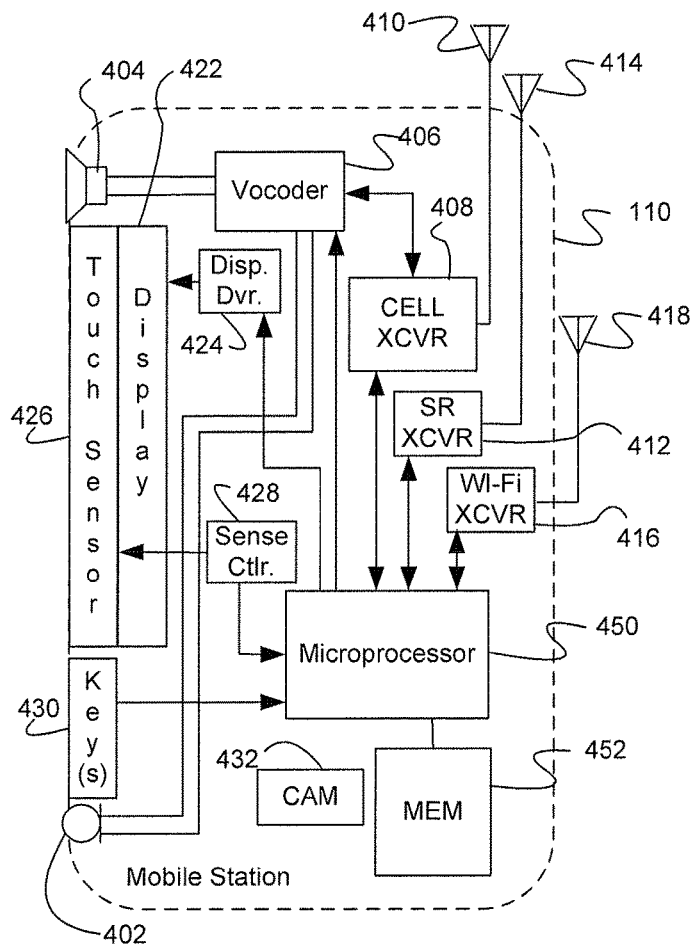
FIG. 4 is a block diagram of a mobile device suitable for use in the shopping environment shown in FIG. 1.

FIG. 4 is a block diagram of an example mobile device 110. Although the mobile device 110 is illustrated as a smart phone type of device, it is contemplated that it may be incorporated to another type of device such as a personal digital assistant (PDA) a tablet computer, a PERS wearable device or the like. The smart phone example of the mobile device 110 may function as a digital wireless telephone station. The mobile device 110 includes a display 422 controlled by a display driver 424 coupled to a microprocessor 450. The display 422 serves as an output device for applications running on the microprocessor 450. The mobile device 110 also includes a touch sensor 426 overlaying the display 422. The touch sensor 426 is transparent so that a user may view information displayed on the display 422. A sense controller 428 senses signals from elements of the touch panel 426 and then detects the occurrence and position of each touch on the sensor 426. The sense controller 428 provides touch position information to the microprocessor 450 which correlates the information to information currently displayed by the display 422 to determine the nature of user input via the screen. For example, the microprocessor 450 may display an image of a soft-key type control on the display 422 and interpret contact with the sensor at a position corresponding to that image as an activation of the control.

The mobile device 110 may also include one or more physical key switches 430 that may be used as inputs to the microprocessor 450. A microphone 402 and speaker 404 may be used as additional user interface elements for audio input (e.g. audio commands) and output. It is contemplated that other user interface elements may be used such as a track ball or joy stick (not shown). The mobile device also includes a camera 432 which is used to capture an image of a bar code or UPC symbol of an item to be purchased, as described below with reference to FIG. 11. Alternatively, the camera may capture another identifying information such as a quick response (QR) code or a stock keeping unit (SKU) code. In another alternative, the mobile device 310 may be equipped with another type of sensor, for example, a near-field communication (NFC) or radio-frequency identifier (RFID) receiver or transceiver, which may be a component of the short-range transceiver 412, that senses an NFC tag or RFID tag attached to the item to be purchased or placed on a counter or shelf adjacent to the item. The process to recover the identifying data from the bar code, UPC symbol or QR, SKU, NFC and/or RFID codes may be performed locally in the geo-fencing application 310 running on the mobile device 110 or it may be performed in the geo-fencing application 215 running on the application server 214.

For digital wireless communication, the mobile device 110 also includes the transceiver 408, for example a cellular transceiver, a short range wireless transceiver 412 and optionally a Wi-Fi transceiver 416. The transceiver 408 is coupled to the microprocessor 450 to transmit data between the geo-fencing application 310 running on the mobile device 110 and the geo-fencing application 216 running on the server 214 via antenna 410.

The microprocessor is also coupled to the short-range transceiver 412 to receive identification signals from the beacons 120 via the antenna 414 and to the Wi-Fi transceiver 416 to receive broadcast advertisement messages from the access point 130, including the MAC ID of the access point. Both the short-range transceiver 412 and the Wi-Fi transceiver 416 are configured to both transmit and receive signals. For example, the short-range transceiver may include a Bluetooth device that supports BLE, and may communicate with a Bluetooth headset (not shown). It may also include multiple types of short-range transceivers, such as an NFC transceiver and/or an RFID transceiver. Similarly, although it is not used in the described embodiment, the mobile device 110 may use the Wi-Fi transceiver to communicate with Internet based applications or with the wireless network 210 via an access point and ISP.

The microprocessor is also coupled to a memory 452 which may include flash memory and random access memory (RAM). The memory 452 includes program code for the applications running on the mobile device 110 as well as data storage for those applications. Applications (APPs) are stored into the memory 542 under control of the operating system of the mobile device 110 and an APP store application (not shown).

Figure 5:
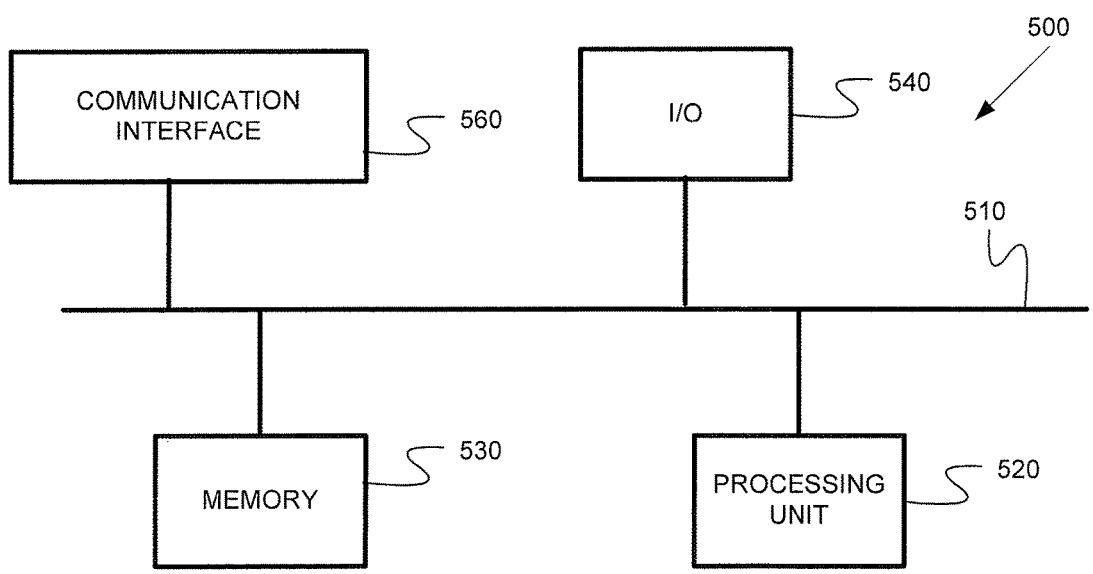
FIG. 5 is a block diagram illustrating components of the network shown in FIG. 3.

FIG. 5 is a block diagram of a general purpose computer platform 500 that is suitable for use as any of the SGW 312, PGW 314, MME 316, HSS 315, AAA 317 or EPDG 318 servers. The platform 500 may also be used as the application server 214. The example server platform 500 includes a data communications interface 560 for packet data communication; a central processing unit, in the form of one or more processors, for executing program instructions; a memory 530 that holds program files and data; and an input/output interface 540. The server platform typically includes an internal communication bus 510 for transferring data among the elements of the computer platform. The server functions may be implemented in a distributed fashion on a number of similar platforms to distribute the processing load. Alternatively, multiple servers may be implemented on a single computer platform.

Figure 6A:
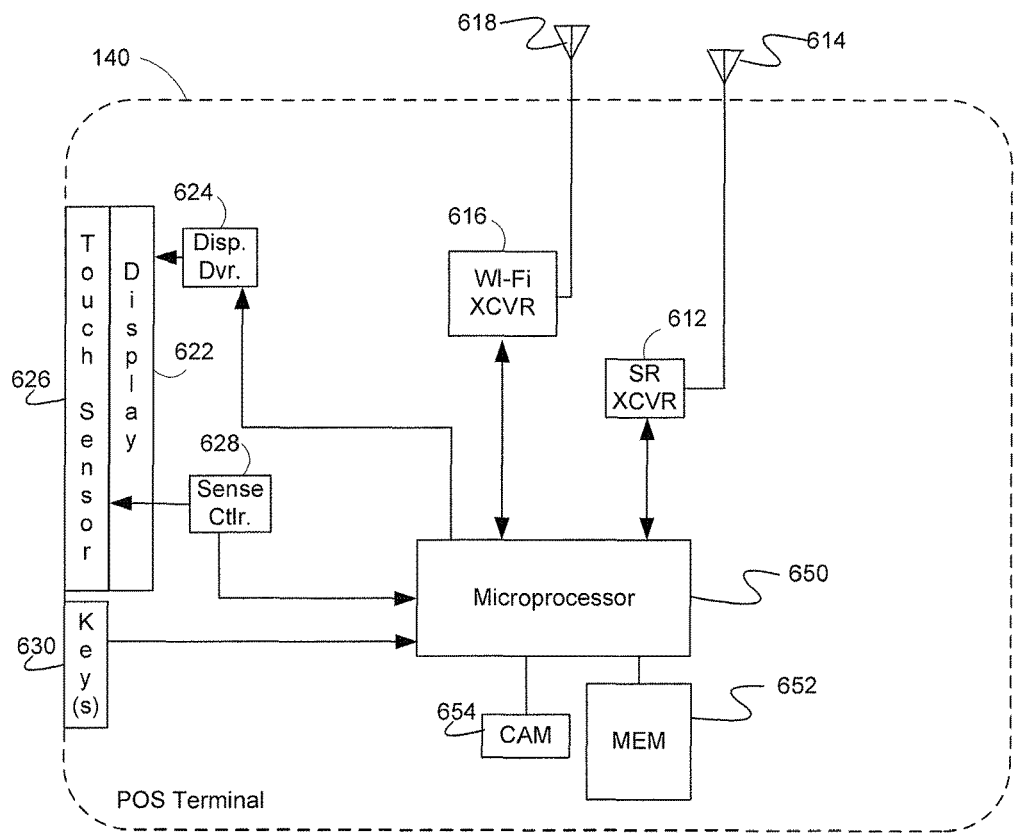
FIG. 6A is an block diagram of a point of sale terminal suitable for use in the retail environment shown in FIG. 1.

FIG. 6A is a block diagram of an example point of sale terminal 140. As described above, the example point of sale terminal is implemented as a tablet computer and includes many of the same elements as the mobile device 110. The example terminal 140 includes a display 622 and touch sensor 626 controlled by display driver 624 and sense control circuit 628 respectively. The terminal 140 may also include keys 630 that provide additional input to the microprocessor 650. Programs and data for the microprocessor 650 are stored in a memory 652 which, similar to the mobile device 110, may include both random access memory and flash memory. The example point of sale terminal also includes a Wi-Fi transceiver 616 coupled to an antenna 618, a short range transceiver 612 coupled to an antenna 614 and a camera 654. The short range transceiver may include one or more of a Bluetooth transceiver, a Bluetooth low-energy (BLE) transceiver, a near-field communication (NFC) transceiver, a radio frequency identifier (RFID) transceiver, an ultrasonic transceiver or an infrared transceiver. Furthermore, although it is shown as a transceiver, it may be a receiver instead. The keys 630, display driver 624, sense control circuit 268, Wi-Fi transceiver 616, short range transceiver 616, camera 654 and memory 652 are all coupled to the microprocessor 650. IN a given venue, all personnel who provide services to users of mobile devices 110 may have POS terminals 140.

Program aspects of the mobile devices 110, POS terminals 140 or the servers may be thought of as products or articles of manufacture typically in the form of executable code and/or associated data that is embodied in a non-transitory computer readable medium such as a flash memory or RAM. This computer readable medium may be a component of the memory 530 or it may be a separate device, for example, a CD-ROM drive or flash-memory drive coupled to the platform 500 via the I/O interface 540. The computer readable medium may also be a component of the memories of the mobile device 110 or POS terminal 140 or it may be a flash-drive coupled to an I/O interface (not shown) of one of these devices.

Figure 6B:
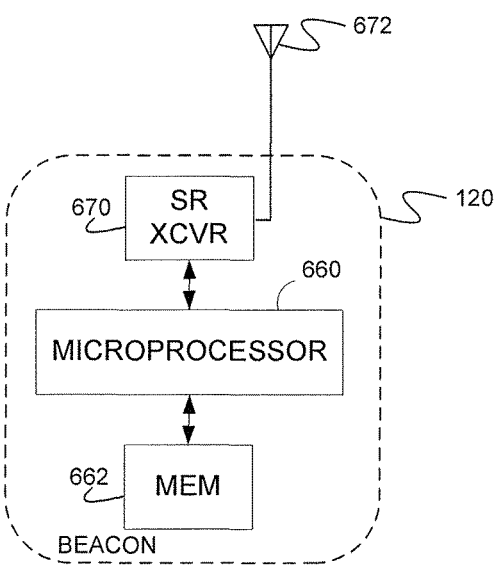
FIG. 6B is a block diagram of a beacon device suitable for use in the retail environment shown in FIG. 1.

FIG. 6B is a block diagram of an example beacon 120 suitable for use with the embodiment shown in FIG. 1. The example beacon includes a microprocessor 660 coupled to a memory 662 configured to hold programming instructions and data. The microprocessor is also coupled to a short range transceiver 670. In one example embodiment the short range transceiver 670 is a Bluetooth low-energy (BLE) device. In an alternative embodiment, the short range transceiver may be a near field communication device or other short range transceiver, for example, an infrared or ultrasonic transmitter or transceiver.

The example beacon is an iBeacon device, available from Apple® Inc. This beacon stores an identification value, a beacon ID, including a 16-byte unique unit identifier (UUID), a 2-byte major value and a 2-byte minor value, that it broadcasts on a regular basis, for example between 1 and 50 times a second or more preferably between 5 and 30 times a second. The stored data value may be programmed, as described below, to indicate the company and/or entity that owns the venue, the venue and the particular zone within the venue. In one example, the UUID designates the company or entity, the major value designates the particular venue and the minor value designates the zone.

In addition, the beacon 680 may be programmed to transmit signals at different power levels. The power level may be adjusted to a relatively low value when the beacon is used as a geo-fence for one of the zones shown in FIG. 1 or to a relatively high level when the beacon is used at the entrance to the venue to automatically sign-in a user. The signal strength may be adjusted so that it is commensurate with the size of the zone. The example entrance zone is relatively large so that customers walking by the store may be enticed to enter and so that customers who have previously scheduled business in the store may be checked-in as they approach the store. Conversely, for a single beacon having a relatively low transmission power may be used for a relatively small zone and multiple beacons having larger transmission power settings may be used for larger zones.

Figure 7:
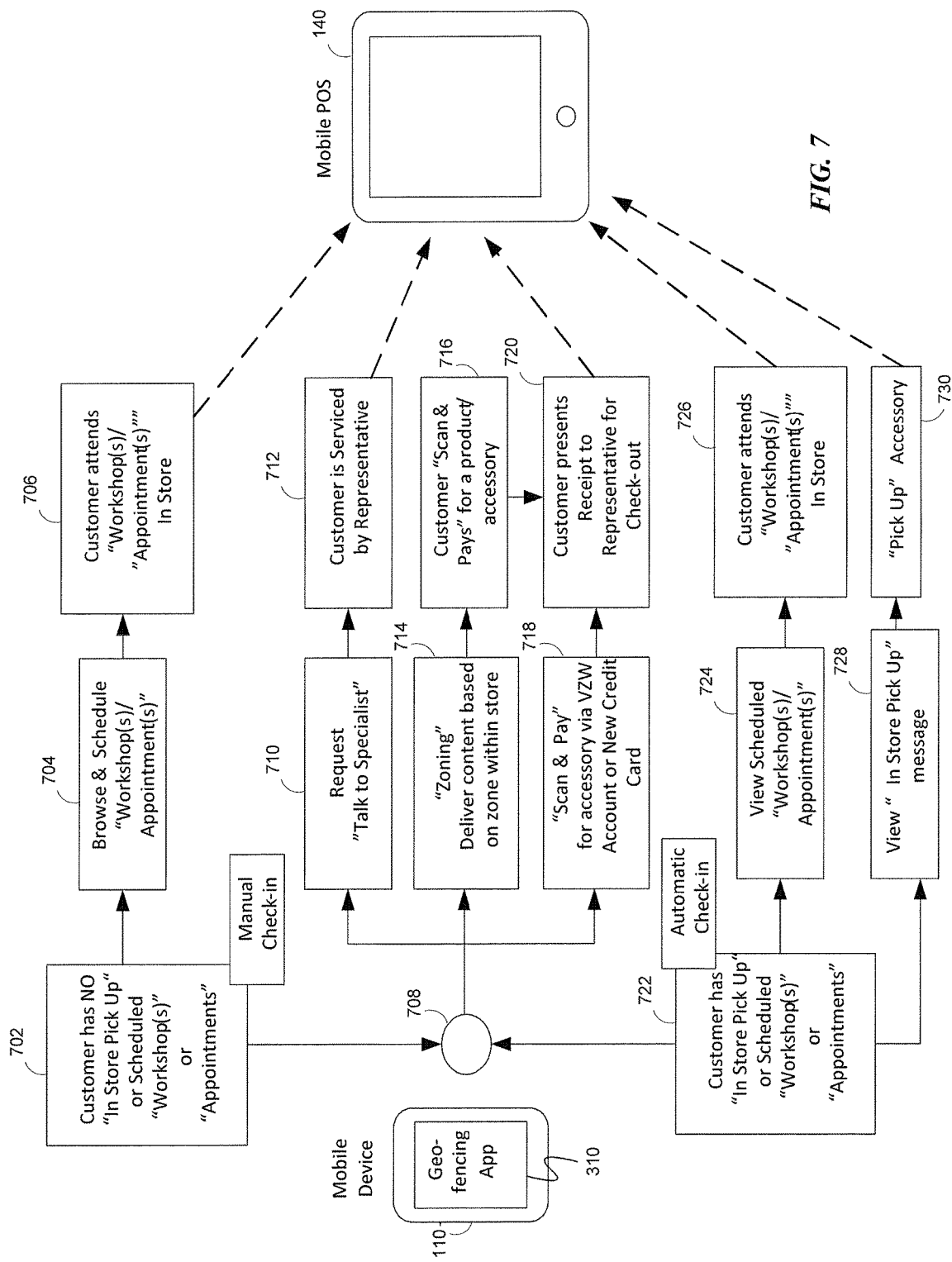
FIG. 7 is a flow diagram illustrating implementation of a geo-fencing application.

FIG. 7 is a flow diagram describing the overall operation of an example geo-fencing system in a retail store including the respective geo-fencing applications running on the mobile device 110, application server 214 and POS terminal 140. In this example a customer may check-in to the system in two ways automatically or manually. For a manual check-in, the customer typically has no in-store pickups, workshops or appointments that have previously been scheduled.

In this embodiment as the device 110 approaches the store, the geo-fencing application 310 running on the device 110 receives either the MAC ID value transmitted by the access point 130 or the beacon ID transmitted by the beacon 120a. The geo-fencing application 310 next determines the power level of the received signal. If the power level is above a threshold level, the application 310 determines that the device 110 is close to the store and causes the MAC ID or beacon ID to be transmitted to the geo-fencing application 215 of the server 214. The threshold level may be set to a lowest signal level at which a reliable connection may be established between the access point 130 or beacon 120a. For example, when the access point 130 is used to define the entrance zone, the application 310 attempts to retrieve the MAC ID when the sensed signal strength is at least −65 dBm. The MAC ID or beacon ID value is sent by the mobile device 110, along with a value that uniquely identifies the mobile device (e.g. a mobile device number (MDN)), to the application server 214. The geo-fencing application matches the value to a company and retail store and accesses the account information for the user of the device 110 to determine whether any appointments, workshops or in store pickups are currently scheduled for that particular store. If none is scheduled, the application causes a message to be displayed to the user asking the user to manually check-in to the geo-fencing application (block 702). Once checked in the user, at block 704, may browse and schedule workshops, schedule appointments and then attend the workshops and/or appointments (block 706). If the customer schedules a workshop or an appointment, information about the user and the workshop/appointment is conveyed to the mobile point of sale terminal 140 via the geo-fencing application 215 on the server 214.

The geo-fencing application 215 may check the customer's account to determine if the customer has scheduled an activity, for example, a workshop, appointment or pick-up, at another store. If she has, the application 215 may then determine whether the scheduled activity may be transacted at the current store. When the current store may accommodate the workshop, appointment or pick-up, the geo-fencing application 215 running on the server 214 may cause the application 310 running on the mobile device 110 to display a message asking the customer if she would like to transfer the previously scheduled activity to the current store. For previously scheduled workshops and appointments, the display indicates any changes in timing. After receiving an affirmative response, the application 215 may automatically schedule the customer for the activity or activities at the current store and cancel the corresponding activity or activities at the other store. Information on previously scheduled activities for a customer may be stored in a database local to the application server 214, for example, the geo-fence database 902, shown in FIG. 9, or in the customer's profile on the HSS 315 or AAA 317.

In addition to the manual check-in described above, the customer may be automatically checked in. Automatic check-in occurs after the mobile device has transmitted the received data value or MAC ID to the geo-fencing application 215 and the geo-fencing application 215 has identified the company and store and has accessed the account associated with the mobile device. If, at block 722, the geo-fencing application 215 determines, from the customer's account information in the HHS 315 or AAA 317 or from its local database, that the customer has an in store pick-up or has previously scheduled a workshop or appointment, the customer is automatically checked in. As part of the automated automatic check in, the user is sent information on the workshop, appointment and/or in-store pick-up (ISPU), which may be displayed on the mobile device 110 (block 724). The customer may then attend the workshops or meet with the appointed person (block 726), without any need to check-in with any of the customer service personnel.

At the scheduled time for the workshop or appointment, the geo-fencing application 215 determines whether the customer is in the store and directs the customer to a particular zone. The zone for a workshop may be for a classroom setting in the store. For an appointment, it may be an office or the customer service counter in the store. When the geo-fencing application 215 determines that the customer is in the appropriate zone, it changes the display of the customer's information on the POS terminal of at least the service representative who is conducting the workshop or meeting with the customer to satisfy the appointment. The display may be changed, for example, to add a check mark to the customer's name or text indicating the workshop or appointment. Alternatively, the application 215 may cause a separate window to be displayed, showing the workshop or appointment and the customer(s) who are present. The customer service representative may then call out the names of each of the customers to verify their presence.

If a customer is not in the store at the scheduled time for the workshop or appointment, the geo-fencing application 215 may send a message to the customer asking if they would like to reschedule. This message may be a text message such as an SMS message or an e-mail or it may be a voice message.

Information about the customer, workshop, appointment or ISPU is also sent, by the geo-fencing application 215 to the mobile POS terminal 140. In this example, if the user has received an ISPU message, to pick up a device previously ordered or purchased over the Internet, the pickup information is transmitted to all of the mobile POS terminals 140 as the user approaches the store. Alternatively, if only certain customer representatives handle in-store pick-ups, the information on the customer and the ISPU may be transmitted to only those representatives. The customer representative, upon receiving the notification, may then prepare the purchased item for pick up by the user. Once the user is checked in at block 708, other features of the geo-fencing application may be accessed.

For example, the user may request to talk to a specialist (block 710). This message may also include a question for the specialist as a brief text message. This results in a message appearing on the POS terminals 140 of all of the customer service representatives. The next available representative contacts the customer to provide the requested service (block 712). The representatives may contact the customer by calling out the customer's name or by causing an SMS message or other type of message to be sent to the customer by the geo-fencing application 215.

The geo-fencing application 215 may also send a message back to the customer indicating a name of a customer service representative, if one has been identified, or an estimated time until the customer will be contacted by a representative. This time may be generated, for example based on the number of customer service representatives that are currently working, the number of other customers having scheduled activities that are ahead of the customer in the queue and the expected service times for those other customers, based on the type of service they have requested. The time estimation algorithm may also take into account time periods in which a representative is scheduled for a workshop or appointment. Any such representative may be temporarily deleted from the list of available representatives until the workshop or appointment is complete.

As a first alternative, instead of sending the message to all of the POS terminals 140, the geo-fencing application running on the server 214 may send it to a single POS terminal 140 that is linked to the zone from which the customer sent the request. As a second alternative, the message sent to the POS terminals 140 includes the identity of the last zone registered by the customer's mobile device 110 to help the customer service representative find the customer. As described above with reference to FIG. 1, as a customer who has logged-in moves through the store, changes in the zone sensed by the customer's mobile device 110 are automatically sent to the geo-fencing application 215 which then sends the zone change information to the POS terminals 140. The application registers each new zone for the device. It also registers when a customer is engaged with a zone, for example purchasing a product offered in the zone or scanning a catalog of items available in the zone. As described below, when a customer is registered as being engaged with an activity in a zone and moves to a new zone, the geo-fencing application may ask the customer whether she wants to continue the activity or terminate it. In one implementation, the customer may receive a message, displayed, for example at the bottom of the screen, indicating the zone change and asking the customer if she wants to continue in the current zone or receive information about the new zone.

As a third alternative, if the customer has asked a simple question, the customer representative may respond with a text message that is sent by the POS terminal 140 to the application server 214 and then to the customer's mobile device 110 for example, as an SMS message. In the example store, each customer representative has a respective POS terminal 140. The POS terminals may either be all identical, such that all representatives receive the same information, or they may each be associated with a particular representative or with a particular zone so that requests suited for a particular customer representative are appropriately routed.

In addition, as described below the geo-fencing application 215 running on the server 214 may deliver different content to the mobile device 110 used by the customers based on the zones within the store. This content may include, for example, a catalogue of items available in the zone or a special promotional item for that zone. As described below, with reference to FIGS. 14A-14E, the content of the display may include both store-wide items and items specifically assigned to the zone. For example, a first promotional item may be displayed as a store-wide promotion at the top of the screen of the mobile device 110 and another, zone specific, promotional item may be displayed below the first promotional item. Similarly, the display may include separate soft-keys allowing a customer to access a store-wide catalog and a catalog specific to the current zone.

As shown in block 716, the customer may purchase the displayed promotional item or a product from the catalog using the scan and pay feature. This transaction may be completed as described below with reference to FIG. 11. Once completed, the geo-fencing application sends a receipt to the customer's mobile device 110 and to one or more of the POS terminals 140 so that the representative can confirm the transaction before the customer leaves the store (block 720). As shown in block 718, the customer may also use the scan and pay facility to purchase an item off of the shelf. To do this, the user may select the item and scan the UPC barcode using the camera 432 of the mobile device 110. The barcode and information identifying the customer or the mobile device are sent to the geo-fencing application 215 to complete the transaction. As shown in Block 718, the customer may charge the purchase to a credit card or to the customer's account on the mobile network. In response to the scan and pay feature, the customer will be sent a receipt displayed on the mobile device 110 (step 720), as described above. The geo-fencing application 310 periodically scans for beacon IDs or for the MAC ID of the access point 130. If the geo-fencing application 310 does not detect a beacon ID or the MAC ID for some number, for example 3, successive scans, it determines that the customer has left the store and signs out of the geo-fencing application 215 and deactivates the geo-fencing application 310 on the mobile device 110.

Figure 8A:
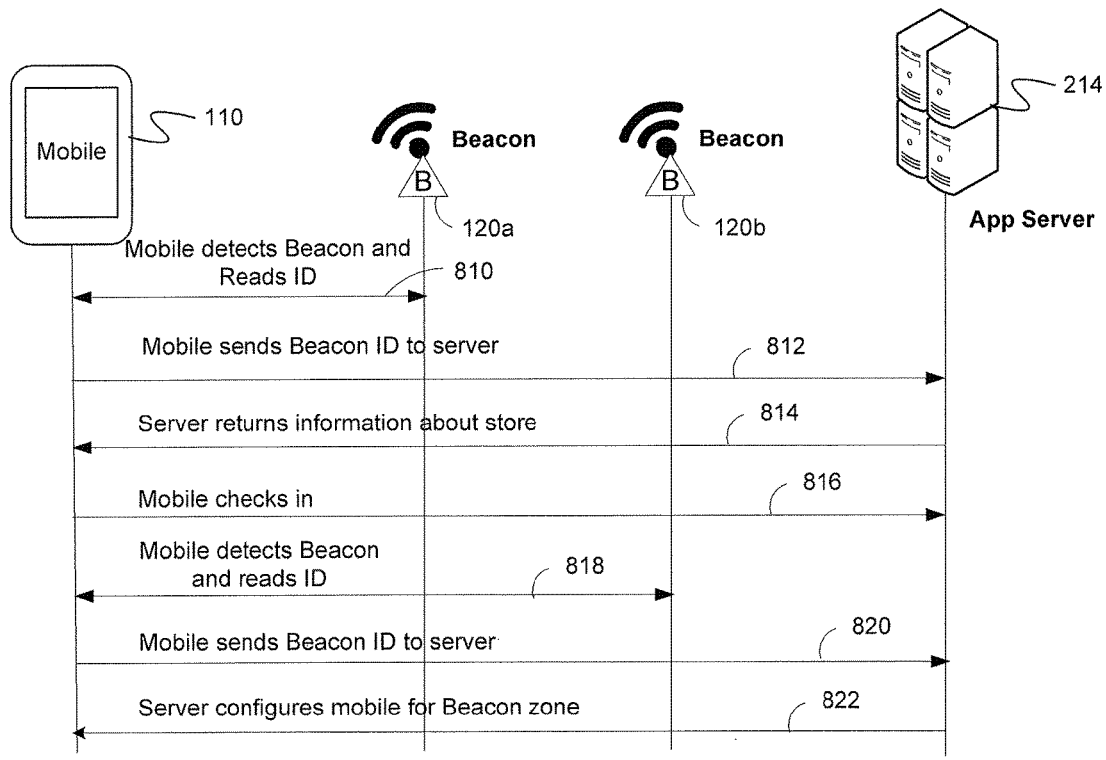
FIGS. 8A and 8B are timing diagrams that are useful for describing different embodiments of the system shown in FIG. 1.
Figure 8B:
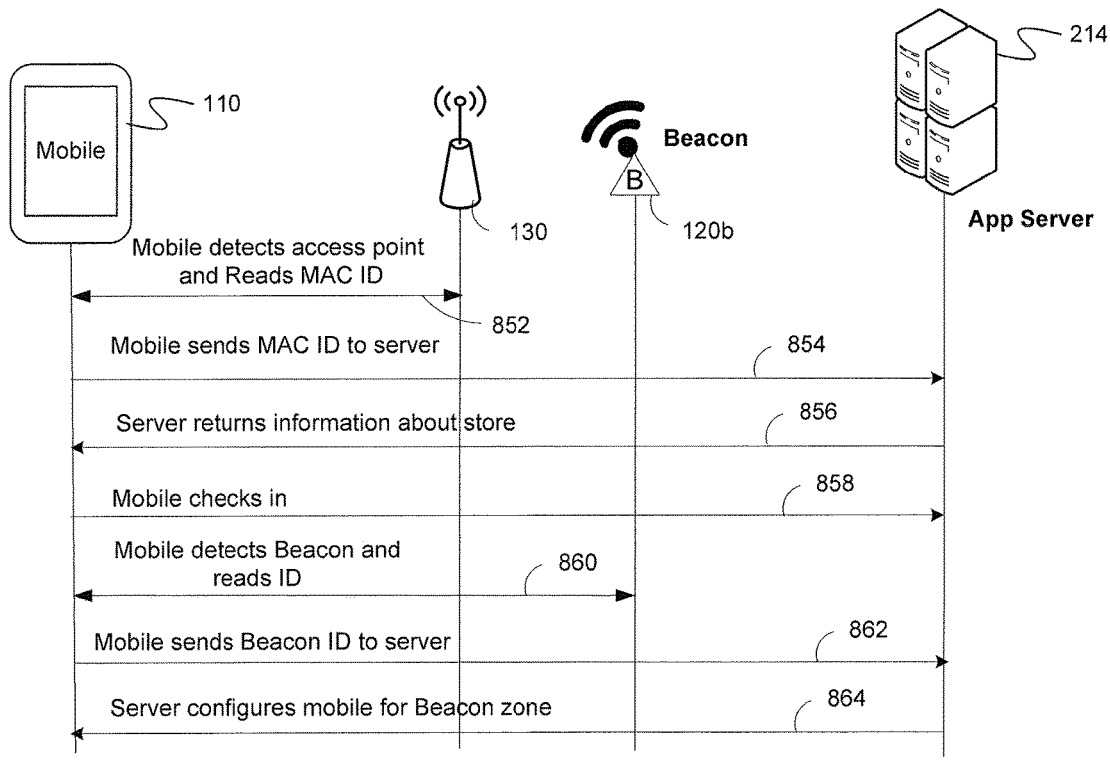

FIGS. 8A and 8B are timing diagrams that illustrate examples of how the mobile device 110a identifies the store 100 and the zones within the store (shown in FIG. 1). As shown in these Figures, before customers enter the store 100, their mobile devices 110a and 110b receive either the MAC ID from the access point 130 or the beacon ID from the beacon 120a to check in to the store. The mobile device for the example shown in FIG. 8A does not sense the MAC ID of any access point. Instead, it senses the beacon ID of the beacon 120a. At step 810, the mobile device 110a detects the beacon 120a and reads the beacon ID. At step 812 the mobile device sends the beacon ID to the geo-fencing application 215 running on the application server 214 to determine which store has the beacon with the received beacon ID. At step 814, the server 214 uses the UUID of the beacon ID to identify the company that owns the store, uses the major value to identify the particular store, and uses the minor value to identify a particular zone within the store that is covered by the beacon 120a. The identity of the company and the store are used to access a database of products and offers that are available in the store. In this instance, the zone indicates that the customer is at the entrance so the geo-fencing application may send the mobile device 110 a message welcoming the customer to the store and inviting the customer to check-in or it may automatically check-in the customer. At step 816, the mobile device checks-in either automatically or manually. At step 818 the mobile device detects another beacon, 120b, and reads its beacon ID. The mobile sends the beacon ID to the geo-fencing application 215 at step 820 and at step 822 the application 215 configures the mobile device for the zone 1 delimited by the beacon 120b, as described above with reference to FIG. 1 and as described below with reference to FIGS. 14A-14E. This configuration includes changing the display to show advertisements and soft-keys specific to the zone. These may be in place of or in addition to advertisements and soft-keys that are for the entire store.

In FIG. 8B, the mobile device 110 can sense both the access point 130 and the beacons 120a-120f. In this instance the mobile device 110 identifies the store based on the MAC ID of the access point 130. The access point 130 has a larger range than the beacon 120a so, by the time the device encounters beacon 120a it has already received the welcome message or been automatically checked in.

At step 852, the mobile device detects the access point 130, reads its MAC ID and sends the MAC ID to the application server 214 at step 854. Based on the received MAC ID, the geo-fencing application 215 identifies the company and the store and accesses the database of products and offers available for the store. At step 856, the server sends the welcome message to the mobile device 110a inviting the customer to check-in. At step 858, the customer checks in either manually, in response to the welcome message or automatically. At step 860 the mobile device enters the store and reads the beacon ID of the beacon 120b, including the UUID, major value and minor value. The mobile device then sends the beacon ID to the geo-fencing application 215 at step 862 and the application, at step 864 returns information on zone 1 covered by beacon 120b.

Figures 1, 9:
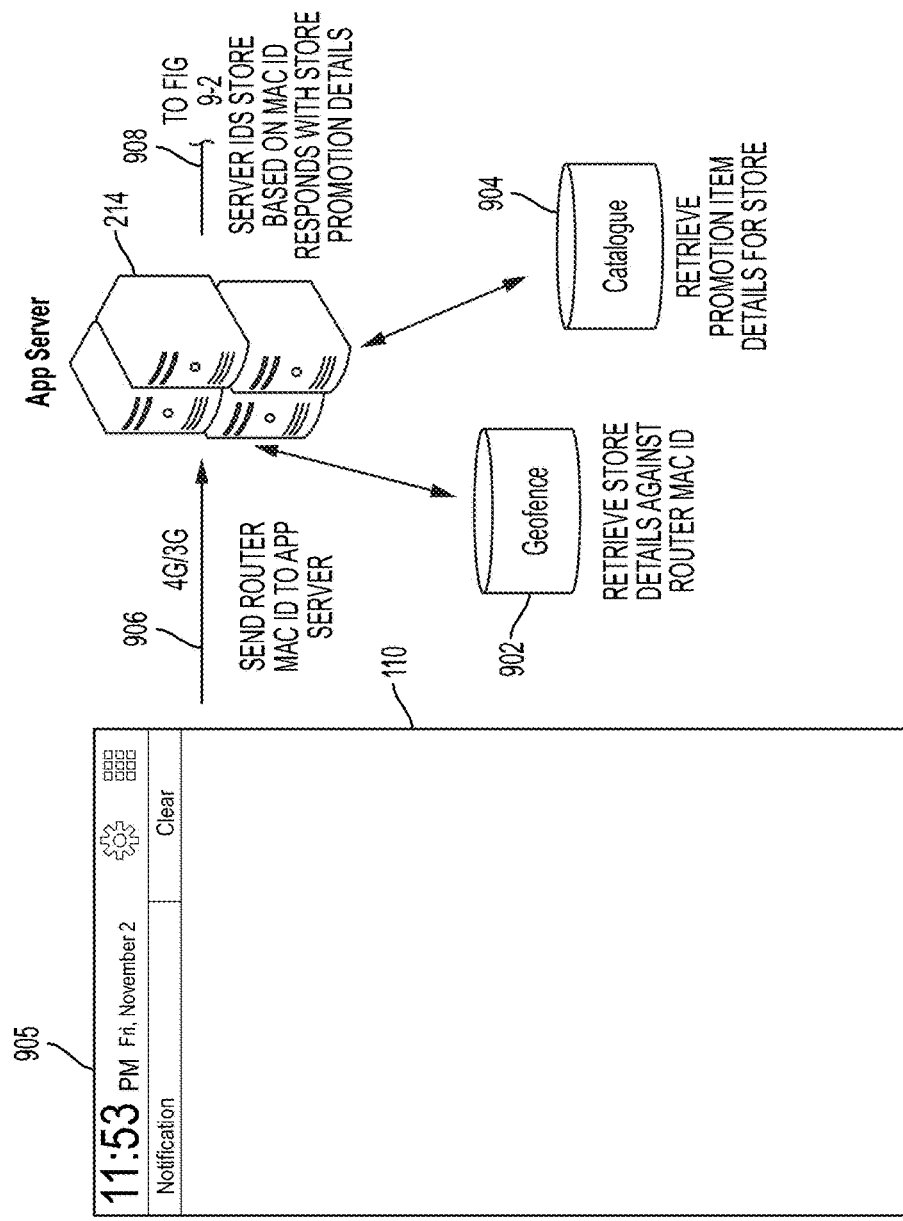
FIG. 9 is a flow diagram illustrating the check in procedure of a mobile device using a geo-fencing shopping application.
Figures 2, 9:
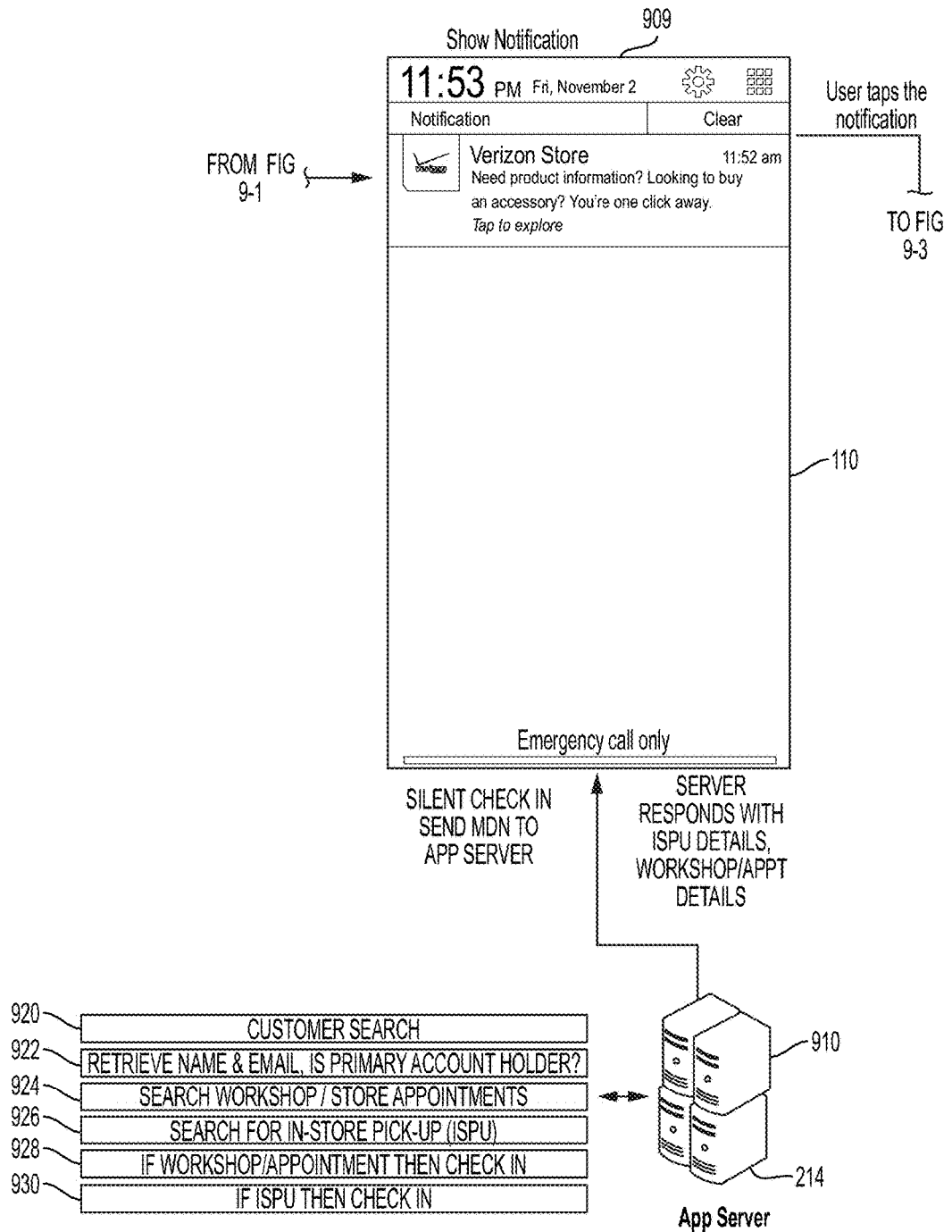
Figures 3, 9:
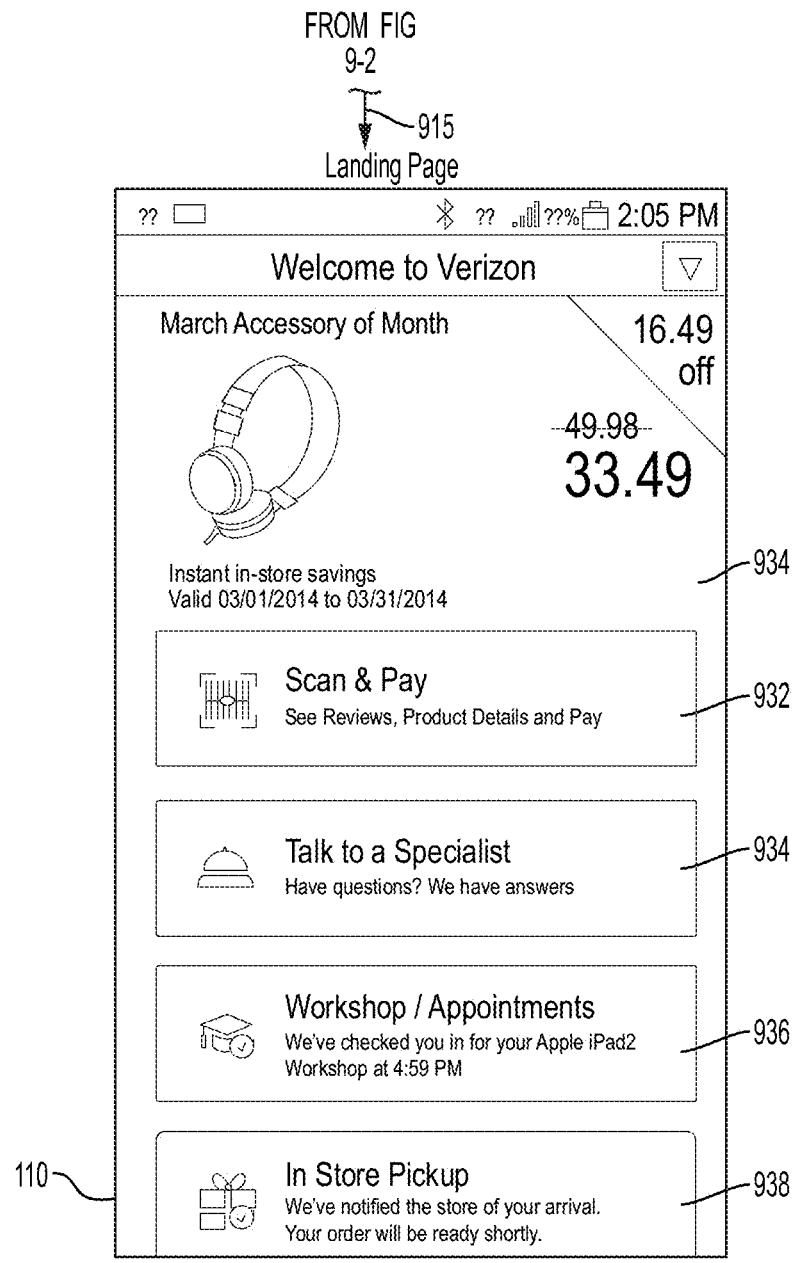

FIGS. 9, 10 and 11 are flow diagrams showing examples of interactions between a mobile device 110, beacons 120, POS terminals 140 and an access point 130.

FIG. 9 is a flow diagram that illustrates a user checking in to the geo-fencing application. At step 905, the portion of the geo-fencing application running on the mobile device 110 scans for a Wi-Fi signal from access point 130, detects the service set identifier (SSID), which identifies the network, and, thus, the company that owns the store, and then detects the basic service set identifier (BSSID) which is also the MAC ID of the router. The MAC ID identifies the particular store. At step 906, the mobile device 110 sends the detected SSID and MAC ID to geo-fencing application 215 running on the application server 214. The application server 214 is coupled to a geo-fence database 902 and a catalogue database 904. The geo-fencing application 215 searches the database 902, based on the SSID to identify the company and, then searches within the records of that company corresponding to the MAC ID. The application server 214 then retrieves from the database 904 the store details, including any zone catalogues and any promotional items for the store.

At the same time, the application server 214, at step 910, accesses information about the customer based on identification information received from the mobile device at step 906. This identification information may be, for example, the mobile device number (MDN), International Mobile Station Equipment Identifier (IMEI), mobile identity number (MIN) or the universal device identifier (UDID). In the example shown in FIG. 3, the identification information is used by the geo-fencing application to access information about the customer from the MME 316, HSS 315 and AAA 317 of the wireless network 210, shown in FIG. 3. At step 922, the geo-fencing application running on the server 214 has retrieved the name and email address associated with the mobile device and determined whether the user of the mobile device is the primary account holder. The primary account holder information may be used as described below, to determine whether the user is authorized to purchase an item using the account associated with the mobile service.

Next, at step 924, the geo-fencing application on the server determines whether the customer has previously scheduled any workshops or appointments. At step 926, the application on the server 214 determines whether the customer has scheduled any in store pickups (ISPUs). If the geo-fencing application determines that any of these events has been scheduled, it automatically checks-in the user as shown in steps 928 and 930. At step 912 the application server sends appropriate information to the mobile device based on the determinations made in steps 924 and 926 (i.e. information about the workshop, appointment or ISPU).

In this instance, the server did not find any in store appointments workshops or in store pickups currently scheduled. Consequently, the geo-fencing application 215 did not automatically check-in the customer but, instead, sent the welcoming message, inviting the customer to manually check in. In response to this message displayed on the mobile device 110, the customer taps the area 909 on the touch-screen 426 of the mobile device 110 to check-in and is directed to a landing page at step 910.

The example landing page includes soft keys. These keys allow the user to scan and pay for an item (932), ask to talk with a specialist (934), schedule a workshop or appointment (936) and schedule an ISPU (938). In addition, the landing page includes an area 940 in which a promotional item may be displayed. As described below, this promotional item may be different for each zone and, thus, may change as the user walks around the store moving from zone to zone. These soft keys are exemplary for a retail store. It is contemplated that different keys may be displayed in different zones within the retail store, for example to request assistance with an item to be returned. Furthermore, it is contemplated that different keys may be displayed for different types of venues.

Figure 9C:
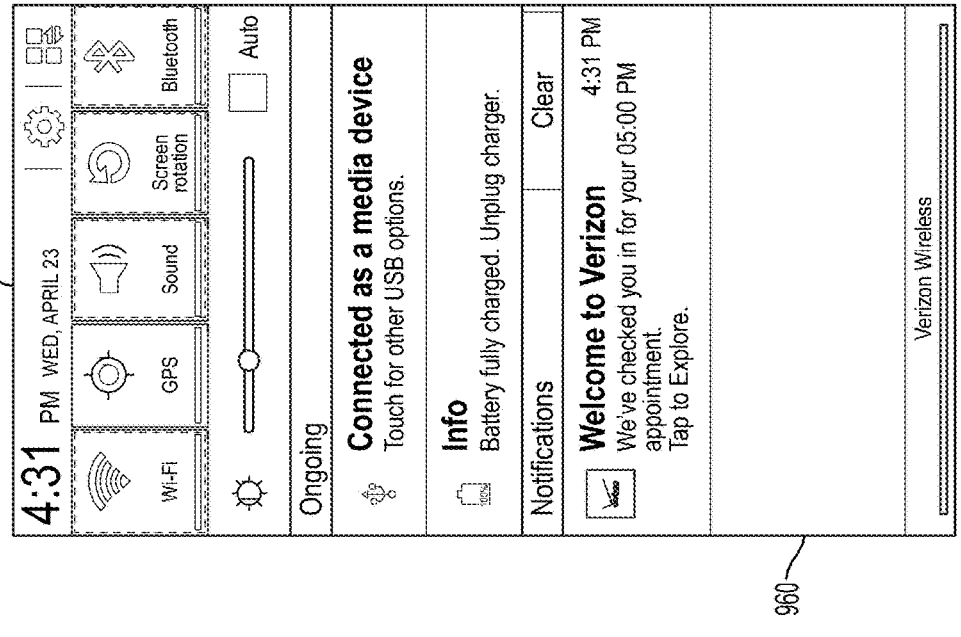
Figure 10A:
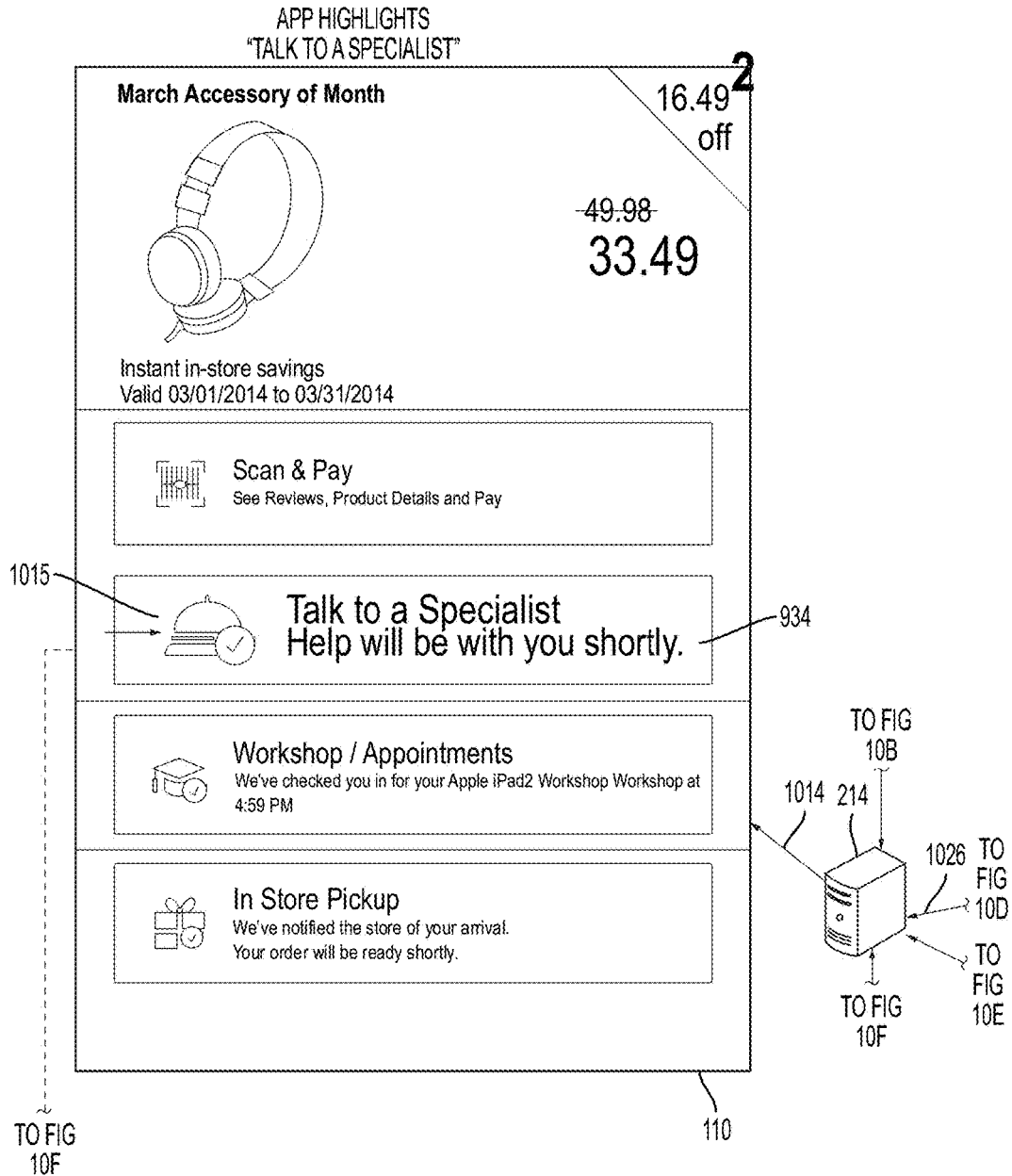
FIG. 10 is a flow diagram illustrating the processing by the geo-fencing application for appointment scheduling and processing of a mobile device.
Figure 10B:
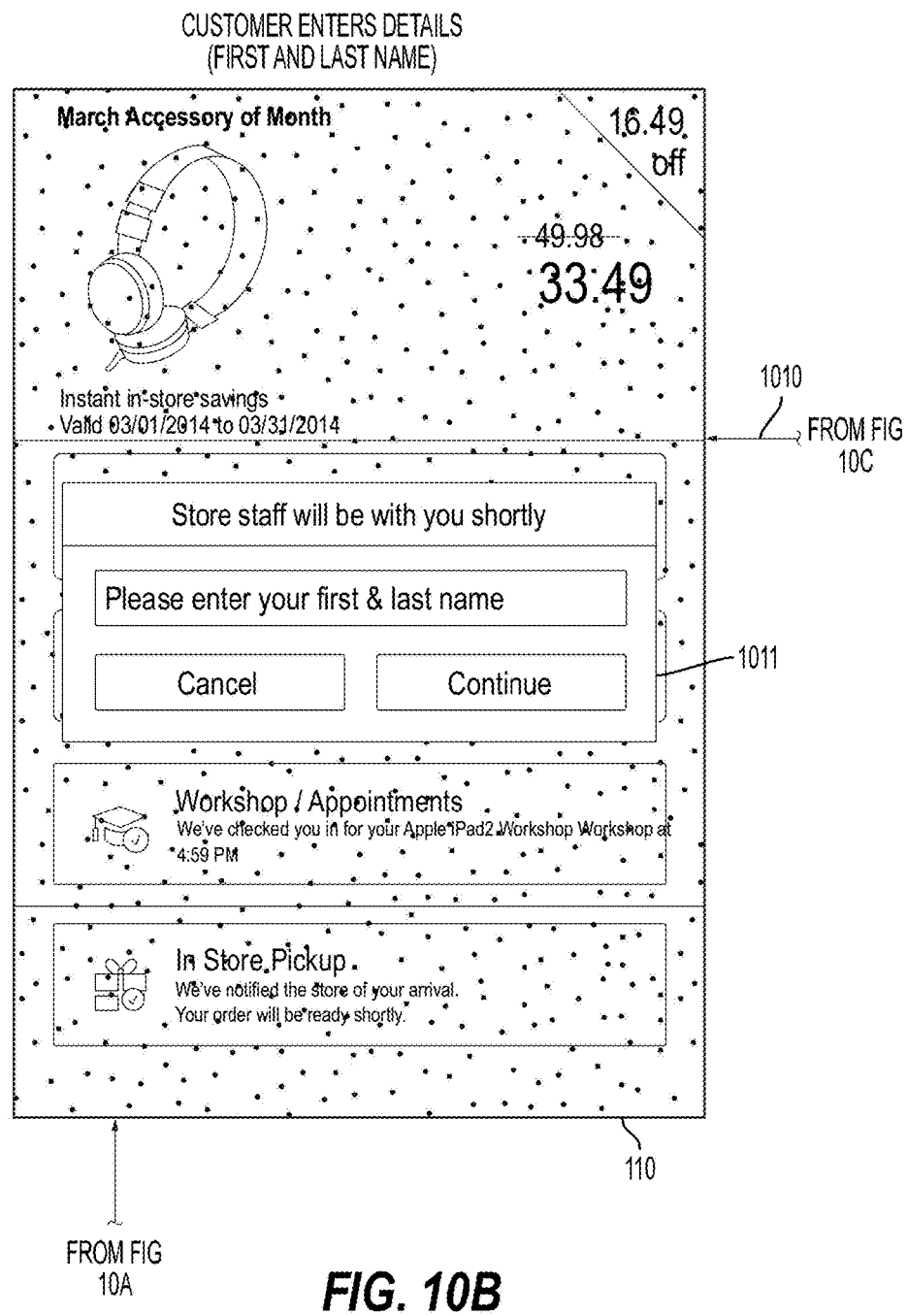
Figure 10C:
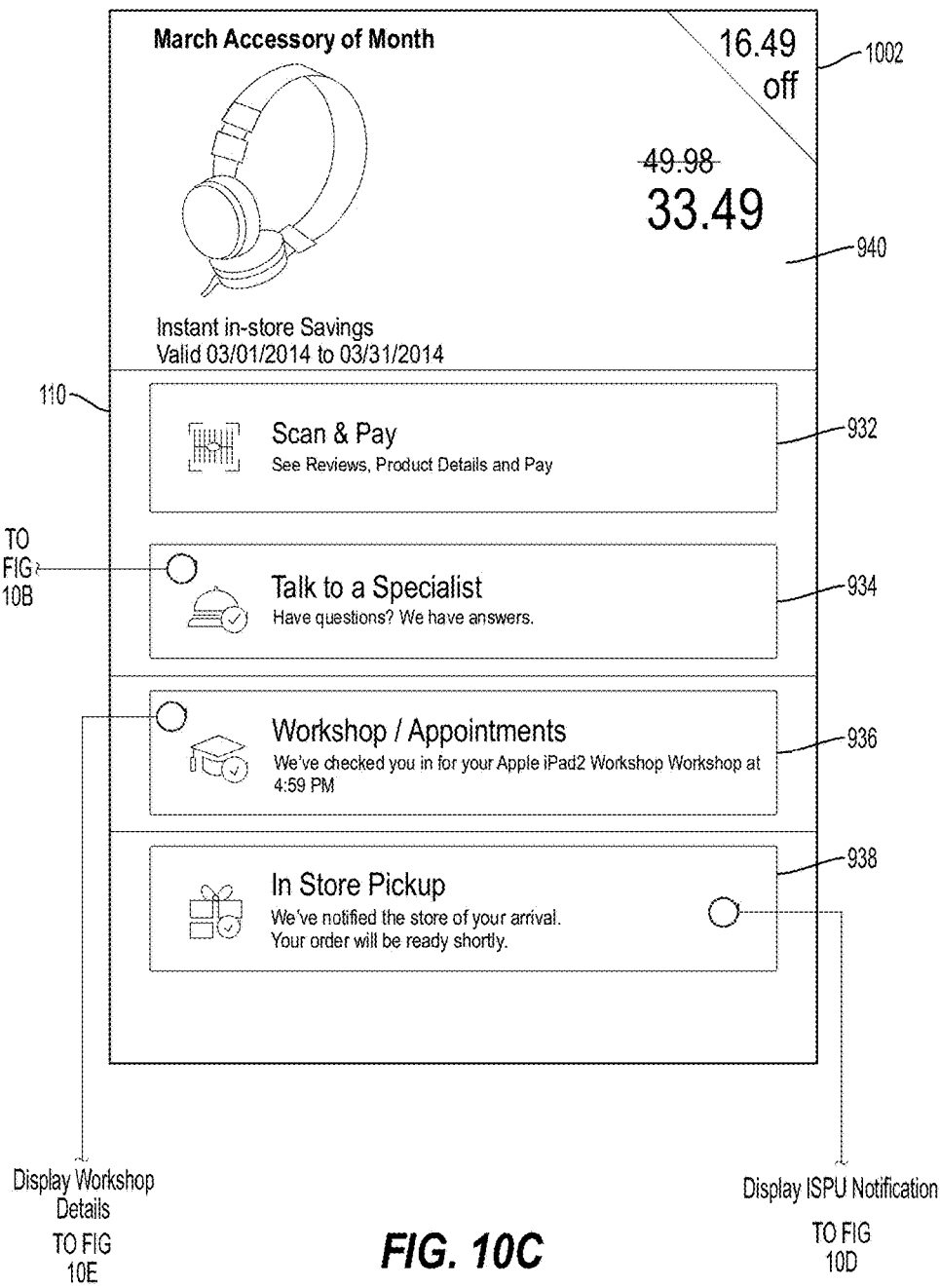
Figure 10D:
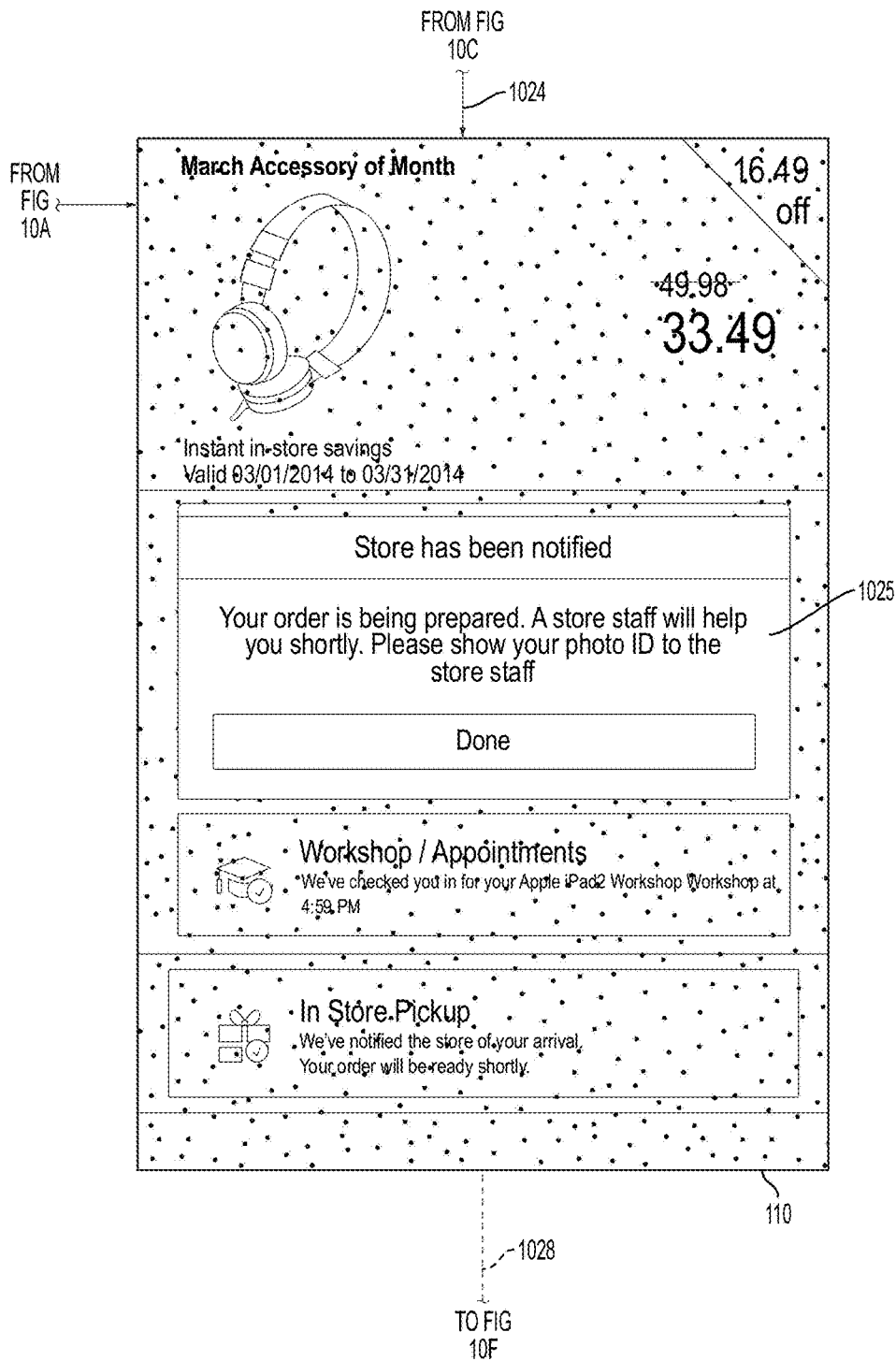
Figure 10E:
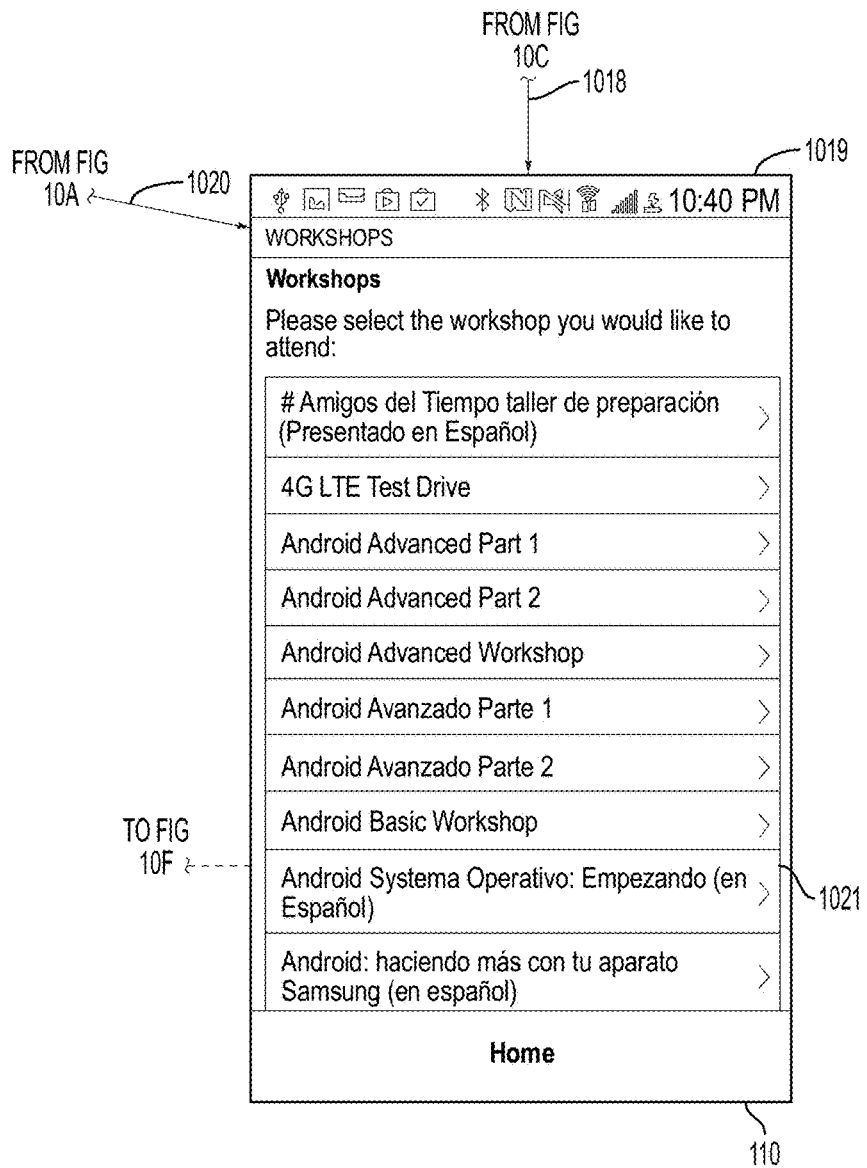
Figure 10F:
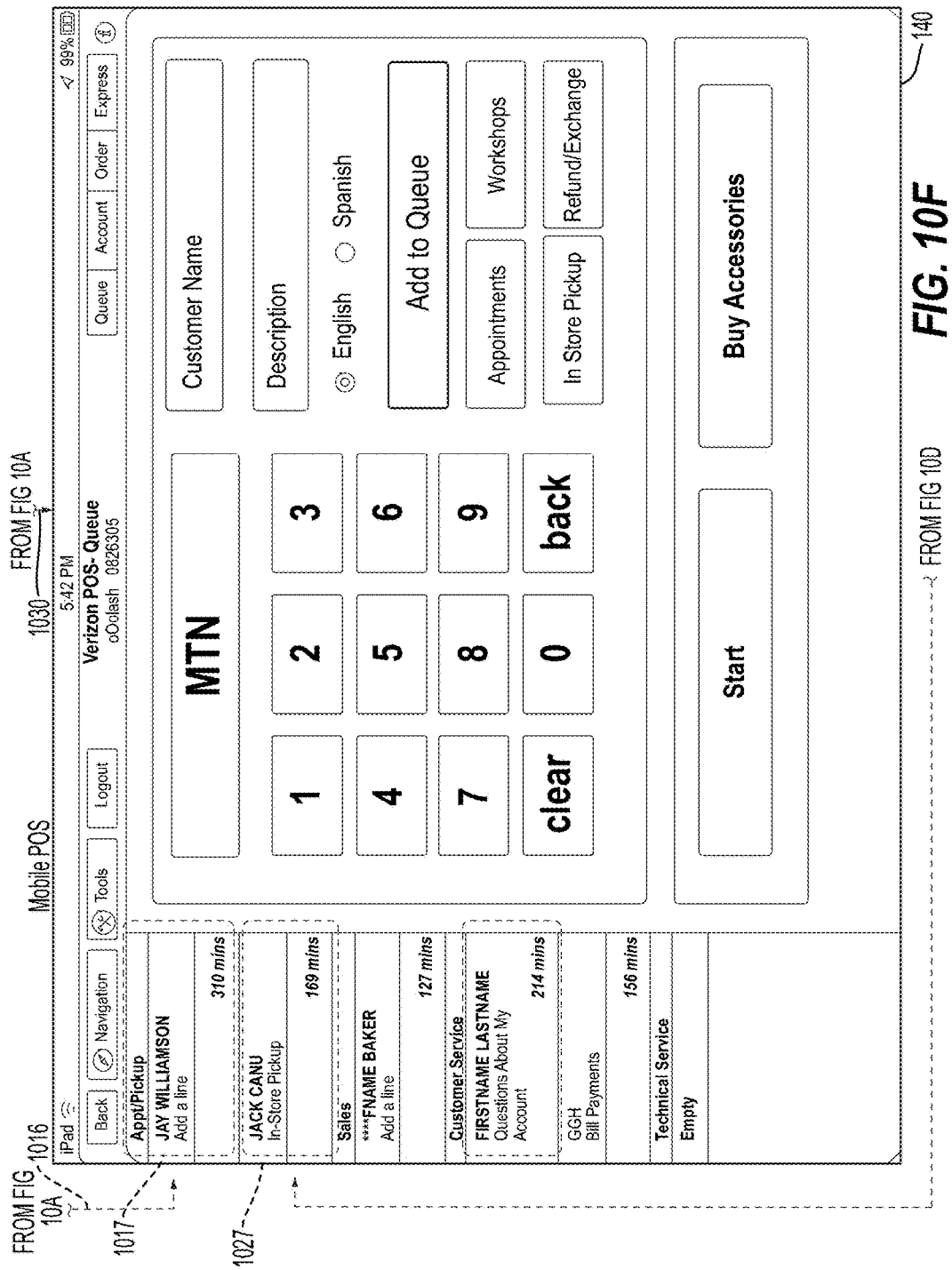
Figure 11A:
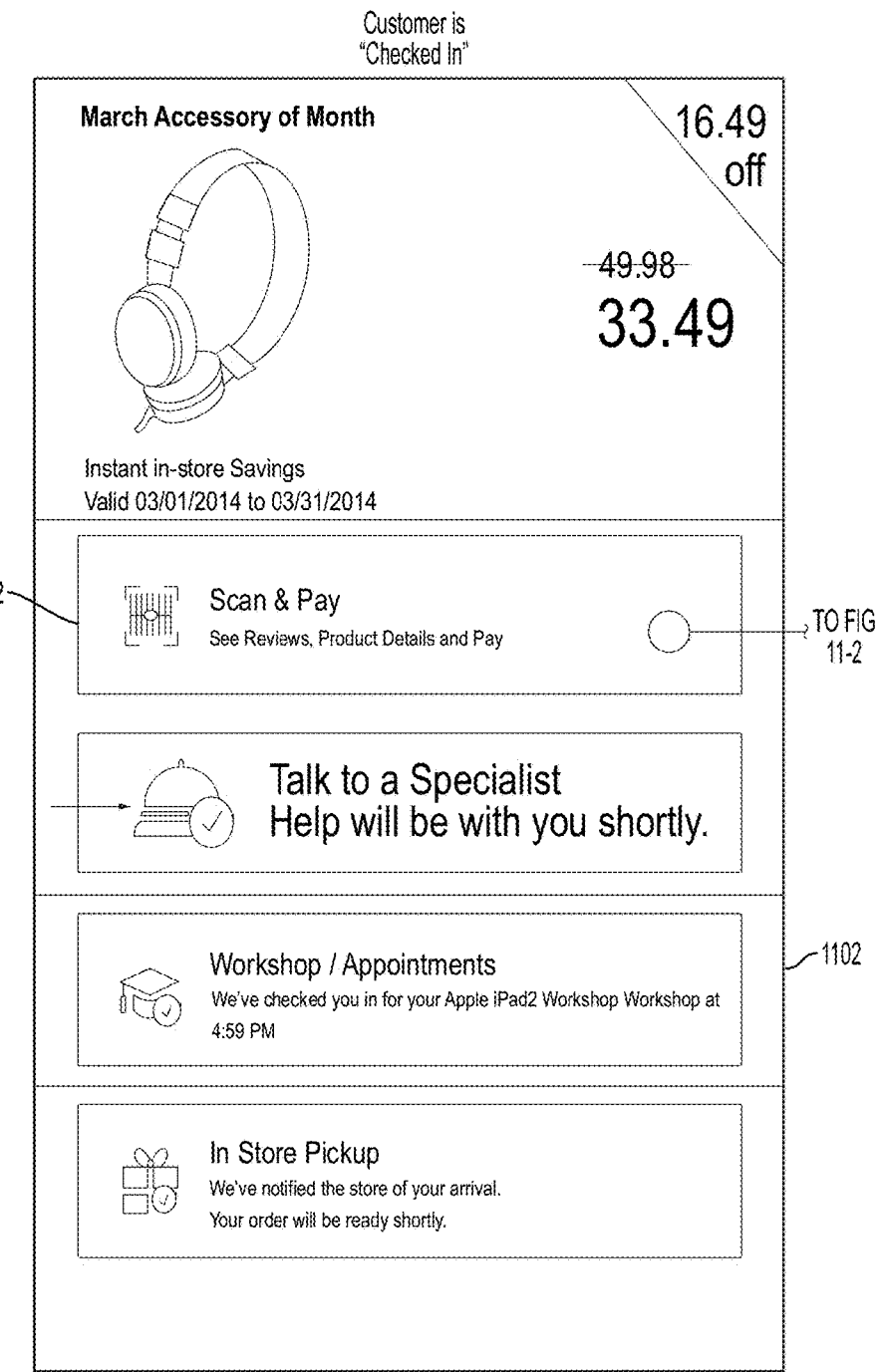
FIG. 11 is a flow diagram illustrating the processing by the geo-fencing application for self-serve purchase of a product using the mobile device.
Figure 11B:
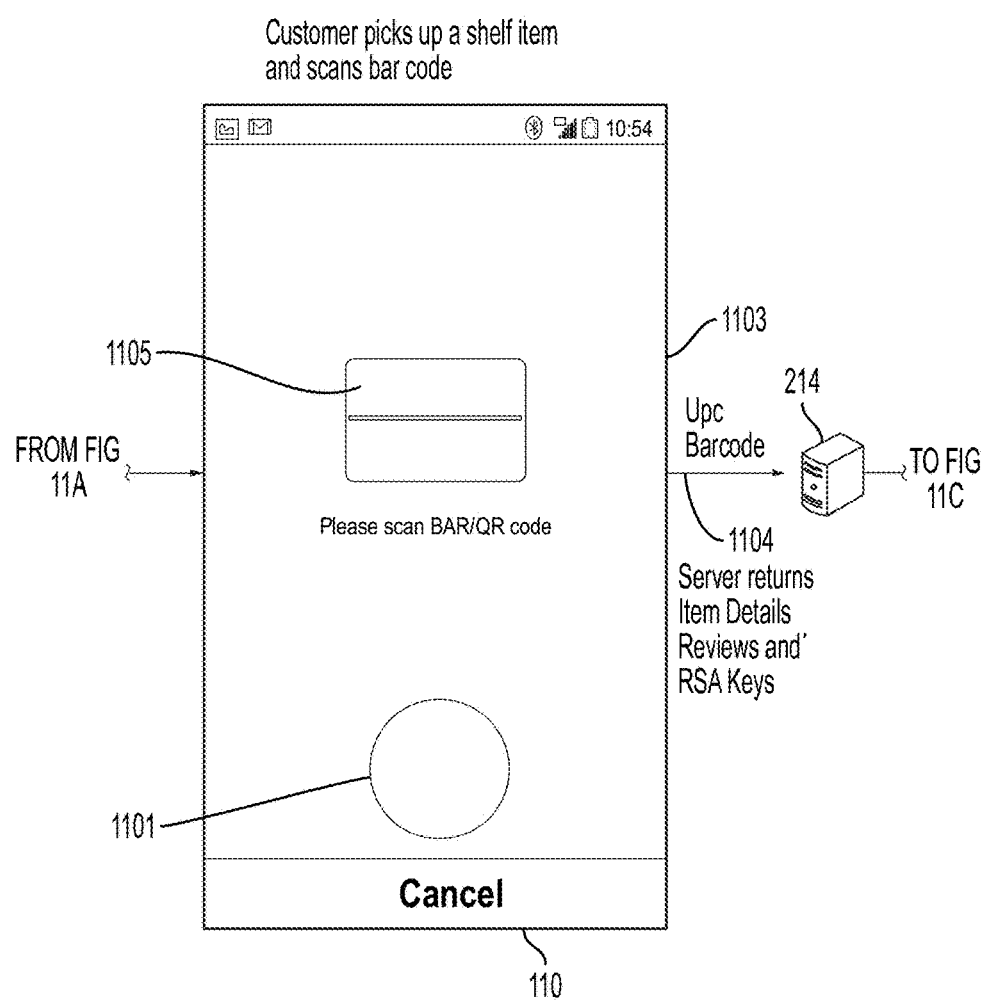
Figure 11C:
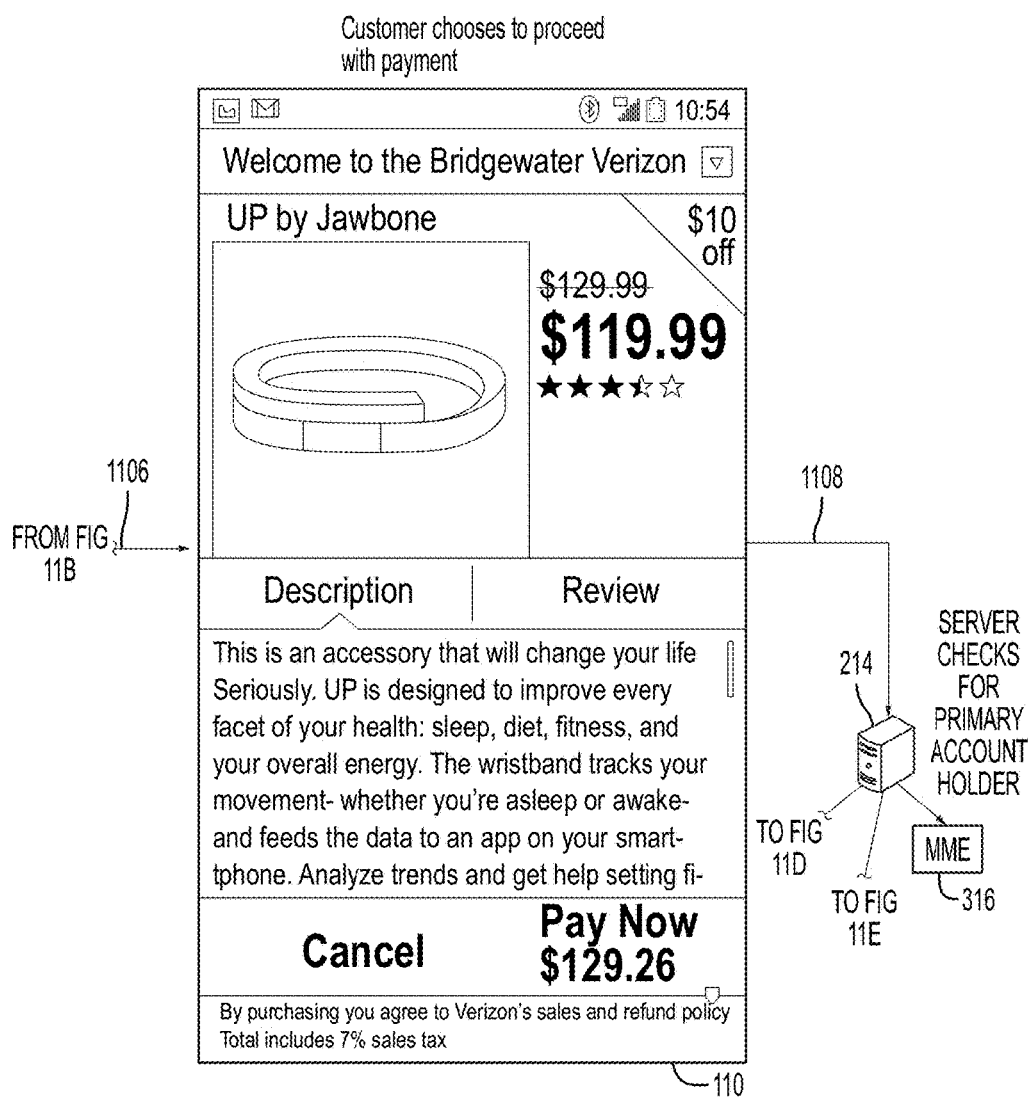
Figure 11D:
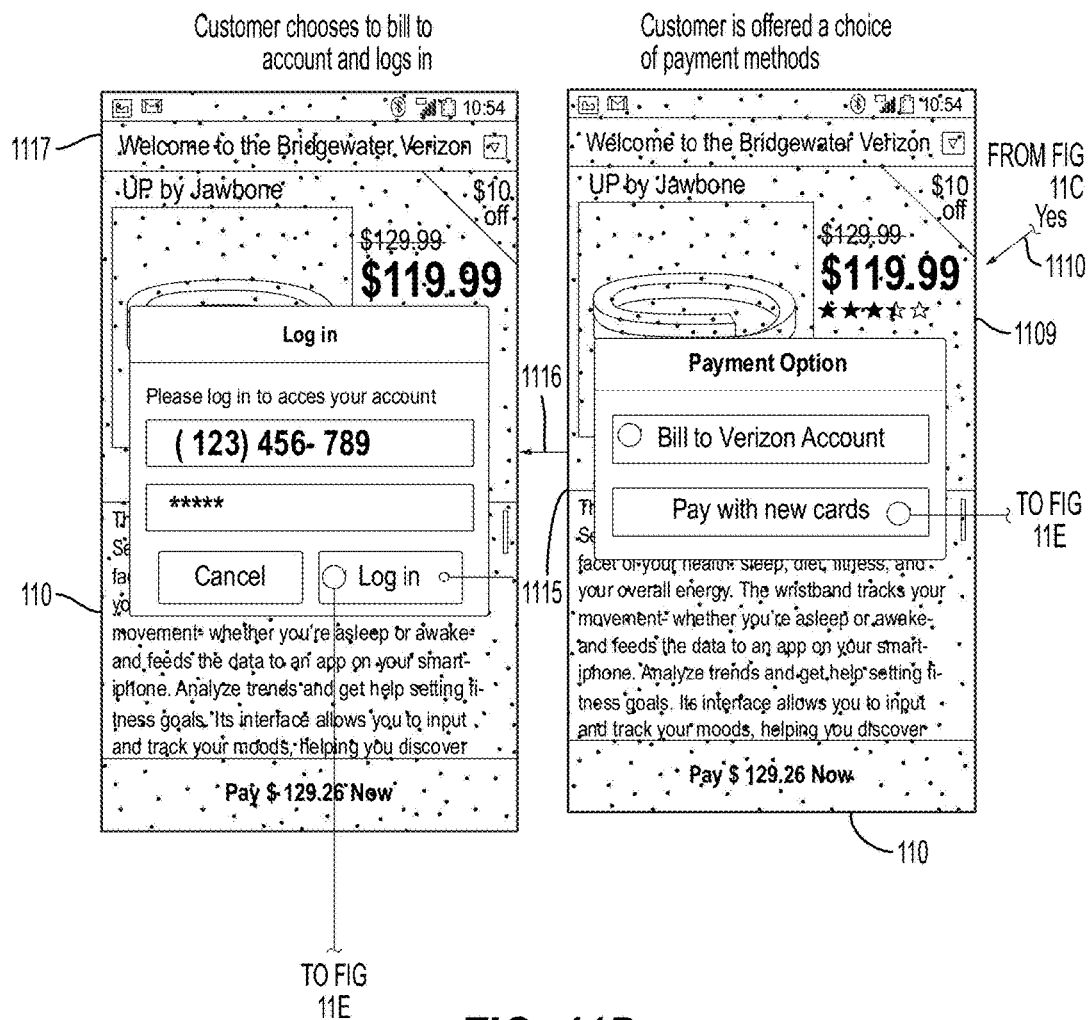
Figure 11E:
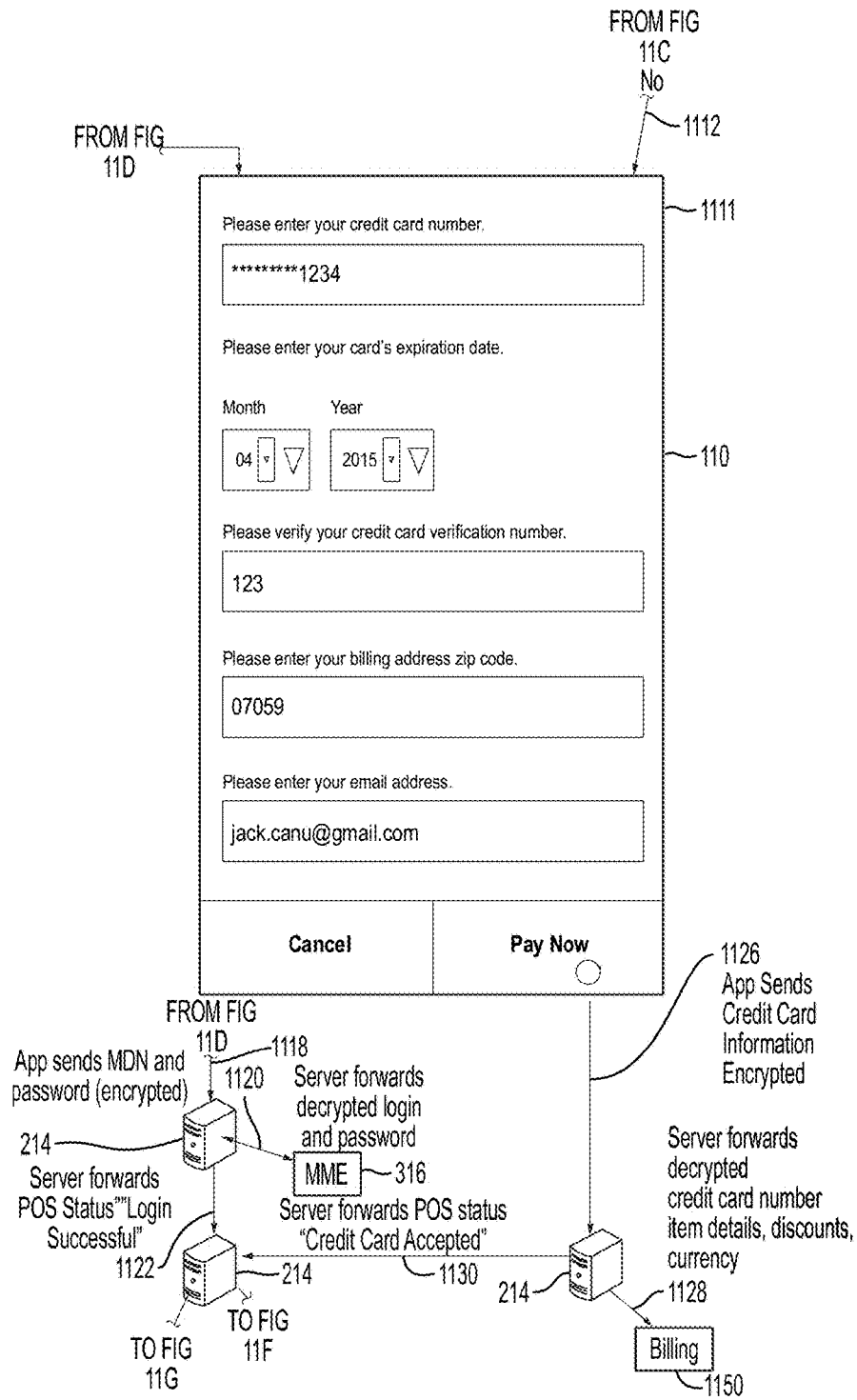
Figure 11F:
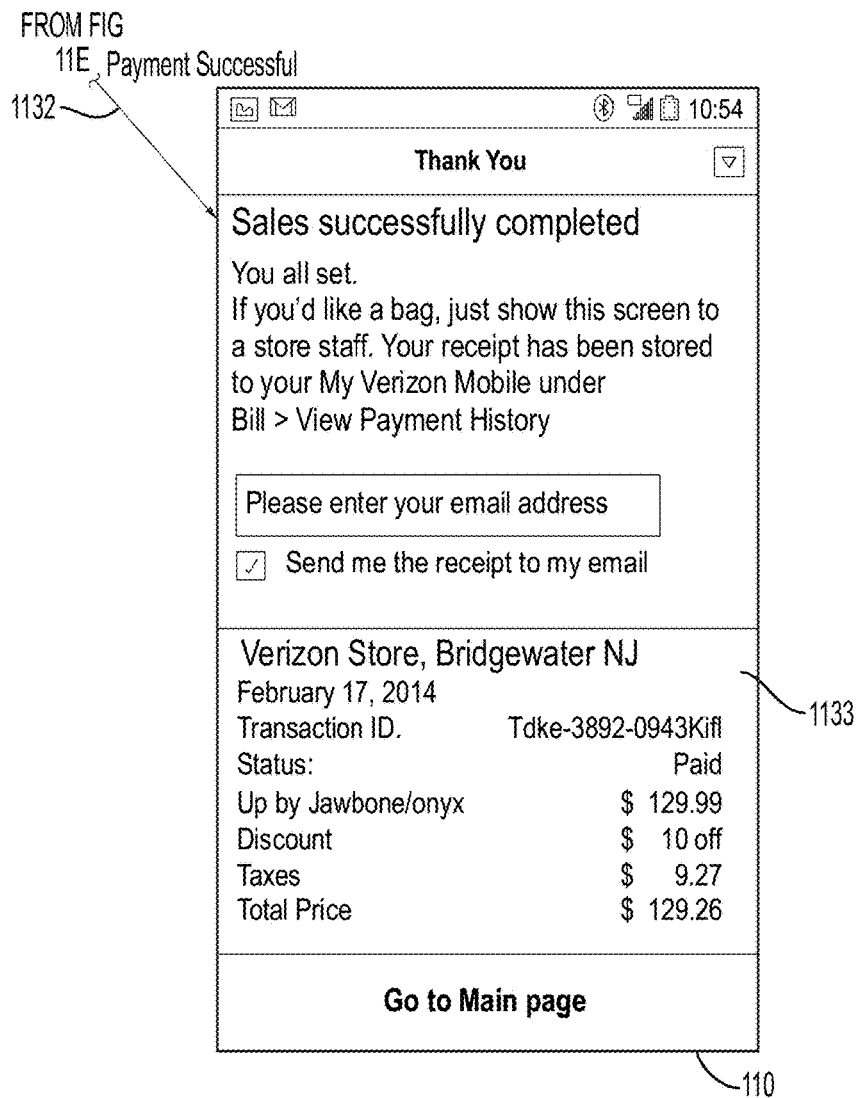
Figure 11G:
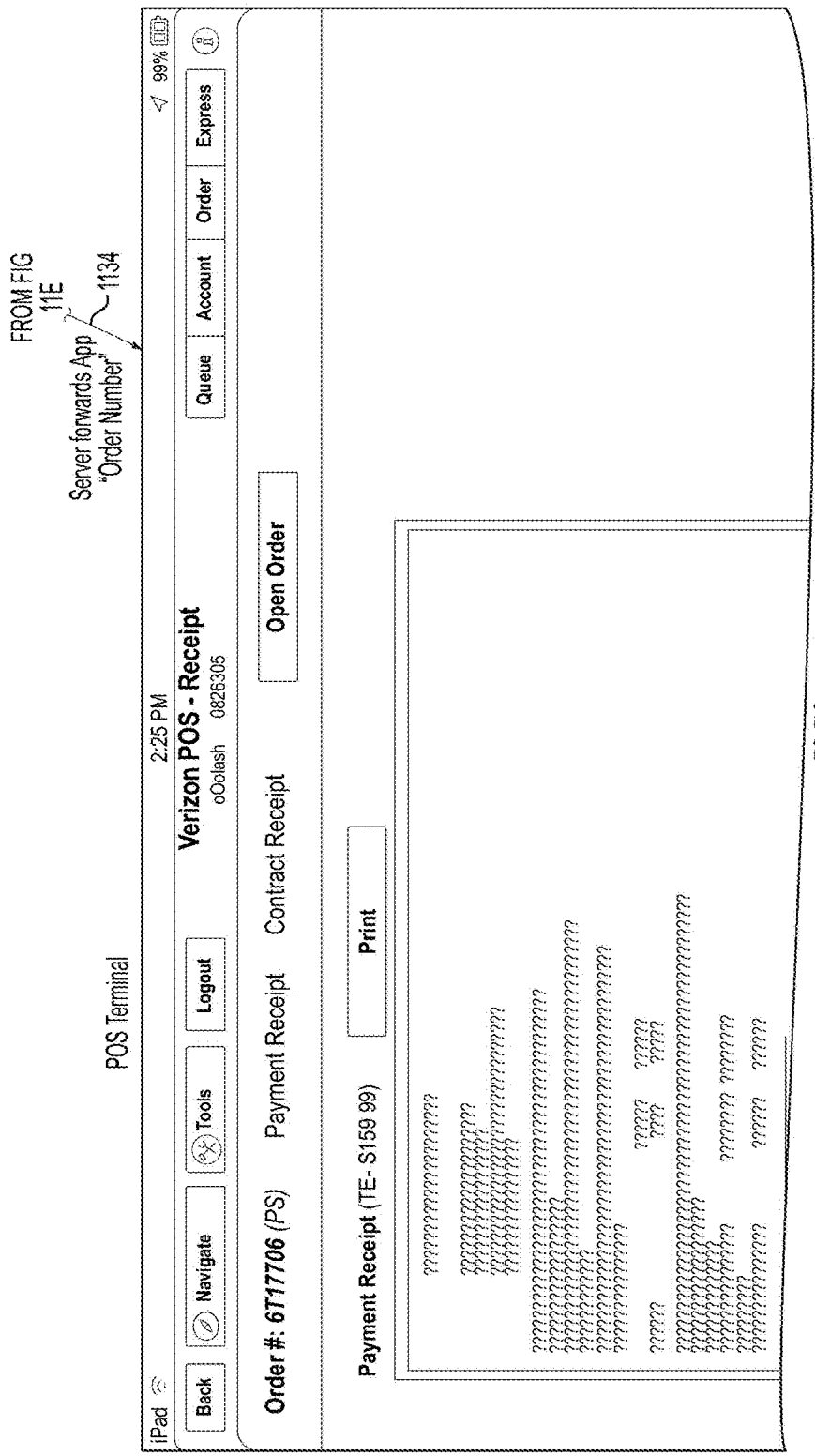

FIGS. 9A, 9B and 9C are screen shots showing example screen images that may be displayed by a mobile device 110 upon checking in to the geo-fencing application. FIG. 9A shows the welcome message 952 that is presented to a customer who does not have any previously scheduled activity with the store. The geo-fencing application displays this screen when the customer is in the entrance zone 101, shown in FIG. 1. Thus, it is displayed to a customer who walks by or enters the store. For all of the screens shown in FIGS. 9A, 9B and 9C, if audio signals are enabled for the mobile device 110, the displayed screens are accompanied by a chime or other audio indicator.

FIG. 9B shows an example of a screen that is displayed to a customer who has previously scheduled activity. As described above, these customers who have previously scheduled activities with a store are automatically logged-in. Thus, the screen 9B is automatically displayed when the customer enters the entrance zone 101. This screen is the landing page of step 915 shown in FIG. 9. The landing page shown in FIG. 9B includes a soft-key 956 that informs the customer that she has been logged in to a previously scheduled workshop. By pressing the soft-key 956, the customer can find out more about the workshop, for example, the location, the material to be covered and the name of the instructor. Soft-key 958 acknowledges the previously scheduled in-store pick-up and notifies the customer that a customer representative will notify her shortly. By pressing soft-key 958, the customer may receive directions on where to go to complete the in-store pick-up and the name of the customer representative who will assist her. Item 954 is not a soft-key in this example. It is a confirmation of the previously scheduled workshop that is referenced by the soft-key 956.

FIG. 9C shows an example automatic log-in screen that is displayed to a customer having a previously scheduled appointment. This screen has a soft-key 960 that informs the customer of the appointment and invites the customer to find out more about the appointment by activating the soft-key. Upon activating the soft-key 960, the customer may be reminded of the subject matter of the appointment and the name of the customer service representative who will meet with the customer.

FIG. 10 is a flow diagram that shows an example operation of the system when various items on the landing page are activated. Block 1002 represents the mobile device 110 displaying the landing page including fields 932, 934, 936, 938 and 940 described above. In a first step, 1010, the user presses the soft button 934, talk to specialist 934. The geo-fencing application on the mobile device then displays a text entry box 1011 in which the user enters a first and last name. The text box 1011 may also include another field (not shown) in which the user may enter text describing what the subject matter of the request. This information is sent to the geo-fencing application running on the server 214 at step 1012. The application server, in turn, sends the information to the mobile POS terminals 140 at step 1030 and modifies the landing page at step 1014 to highlight the talk to a specialist entry 934 and include a check mark 1015 indicating that the request has been registered. The registered request 1017 is also shown on the mobile POS terminals in response to the information transferred at step 1030.

In a second example at block 1002 the user presses the soft button 936 to sign up for a workshop. In response to pressing this button the mobile device 110, at step 1018, displays a workshop selection page 1019. When this page is displayed the user presses a soft button 1021 to select a particular workshop. This information is conveyed to the geo-fencing application 215 on server 214 at step 1020 and from the server 214 to the mobile POS terminals 140 at step 1030. The information conveyed to geo-fencing application 330 on the POS terminals 140 is stored in an internal table on each terminal that is associated with the particular workshop so that the customer representative running the workshop has a list of attendees. This information is also stored on the server 214 by the geo-fencing application 215 so that the customer may be charged, if there is a fee for attending the workshop. In this example, there is no fee. If there were a fee, however, payment may be accomplished in the same way as for the scan and pay function, described below with reference to FIG. 11.

In the final example shown in FIG. 10, the customer presses the soft button 938 to schedule an in store pickup of a previously purchased item. For this notification, at steps 1024 and 1026, the request is sent by the mobile device 110 to the geo-fencing application on the server 214, which sends a message 1025 to the mobile device 110 informing the customer that the store has been notified of the pickup request. This notification is sent by the application server 214 to the mobile device 110 at step 1026. Information about the in store pickup is also conveyed to the mobile POS terminals 140 via the application server 214 at step 1030 and an entry 1027 is added to the queue informing the customer representatives that the customer is ready for the in-store pickup.

FIG. 11 is a flow diagram of an example of the scan and pay function of the system to purchase an item off of the shelf. At block 1102, the customer selects the scan and pay function by pressing the soft button 932 on the mobile device 110. At step 1103, the mobile device displays a scan window 1105 for an image captured by the camera 432 (shown in FIG. 4) of the mobile device 110 and prompts the user to scan the bar code using the camera and press a scan-capture soft button 1101. The scanned bar code is sent to the geo-fencing application 215 on server 214 at step 1104.

In response to receiving the bar code, the geo-fencing application 215 returns details about the scanned item including, for example, product specifications, product price, customer reviews and encryption keys to be used to complete the purchase. This information may include text pages, short video files and/or audio files. In step 1107, this information is provided to the mobile device 110 and the user is presented with the option of paying the amount requested or cancelling the transaction. At step 1108, the user presses the pay button and the request to pay is transferred to the geo-fencing application 215.

At step 1110 the method of payment is determined. In this example, the customer has two choices: payment from the customer's wireless account or payment using a credit card. At step 1114, the geo-fencing application 215 determines whether the customer is able to charge the purchase to the customer's account. In this step a message is sent by the server 214 to the MME 316 which accesses the customer's account information from the HSS 315 and AAA 317 which responds with an indication of whether the customer is the primary account holder. If the customer is the primary account holder, step 1109 presents the customer with a window 1115 that allows the customer to choose between charging the item to the customer's wireless account or paying with a credit card.

At step 1116, the user has pressed the button indicating a desire to charge the amount to the customer's account and in block 1117, the user is presented with a log-in screen. The log-in may require the customer to enter an identifier, such as a phone number associated with the account, and a password. When the user provides this information and presses the log-in button step 1118 encrypts the information using the provided encryption keys and transfers it to the geo-fencing application 215 which, at step 1120, decrypts the log-in information and confirms it via the MME 316, HSS 315 and AAA 317. If the log-in is successful, the server 214 indicates a successful payment at step 1122 and sends a receipt to the customer's device 110 and to the mobile POS terminal 140, as described below.

Returning to step 1112, if the customer is not the primary account holder and, thus, cannot charge the item to her account or if, at step 1109, the customer selects payment by credit card (step 1124) then the geo-fencing application processes a credit card payment. In step 1111 the geo-fencing application on the mobile device 110 displays a screen allowing the customer to verify a previously stored credit card or enter new credit card information. Once the information is entered at step 1126, the customer presses the pay now button and this information is encrypted with the provided encryption keys and sent to the geo-fencing application 215. At step 1128, the geo-fencing application 215 running on the server 214 decrypts the credit card information it to the billing system 1150. Alternatively, the application 215 may forward the encrypted credit card information, with the encryption keys, and details of the purchase to a billing system 1150. The billing system, which may be external to the wireless network 210, determines whether the credit card is valid and whether the customer is authorized to charge the purchase to the credit card.

In response to a determination that the charge is allowed, the geo-fencing application 215 notifies the mobile device 110 and the POS terminal 140 that the sale has been approved at step 1130. At step 1132, the geo-fencing application 215 causes a receipt 1133 to be displayed on the mobile device 110. At the same time, the geo-fencing application 215 causes a corresponding receipt 1135 to be displayed on the POS terminal 140. After receiving the receipt 133, the user finds a service representative who compares the receipt on the phone to the receipt on the POS terminal 140 in order to complete the sale. The geo-fencing application 215 may provide additional information to the customer, such as the name of a customer representative who can verify the transaction and/or a map of the store guiding the customer to the service representative or to a sales desk by the shortest route based on the last zone registered by the geo-fencing application 215 for the customer's mobile device 110. As shown the service representative has the option of printing the receipt from the POS terminal so that the customer may have a hard copy in addition to the copy 1133 on the mobile device 110. If the customer does not show the receipt to the service representative, she will be required to pay for the item at a sales desk of the store.

As described above, the POS terminal 140 includes a short range transceiver 612 and antenna 614 by which the POS terminal may communication with the beacons 120. The purpose of this communication is to allow the customer service representatives to configure the beacons 120 in the store 100. The process of configuring the beacons is shown in the flow chart of FIG. 12. At block 1202, the service representative displays the current beacon configuration for the store. In this example, the beacon configuration is stored in both the POS terminals 140 and the geo-fencing application on the server 214.

At step 1204 the service representative is presented with an option to add or delete beacons from the list. If a beacon is to be added step 1206 is executed which adds a record for the beacon to a beacon configuration file. The beacon configuration file may include information relevant to a particular beacon including its beacon ID, its zone and data on products or offers related to the zone. For the iBeacon example, the UUID, minor and major fields of the beacon's identification value are initially blank. The record for the beacon in the configuration file is initially blank except that it has its UUID set to indicate the company, its major value set to indicate the store and its minor value set to a next consecutive number in a sequence of numbers to identify the particular beacon. These values are known to the geo-fencing applications 215 and on the POS terminal 140 as both of these applications are have access to the company and store identifiers and the identifiers of the existing beacons in the store.

After step 1206 the controller returns to step 1202 so that all of the beacons that have been configured for the store are displayed. At step 1208 the service representative is presented with the option of deleting a beacon. To delete the beacon the process executes step 1210 which removes the beacon record from the configuration file.

At steps 1212-1224 the service representative may modify or enter parameters for a particular beacon. At step 1212 the service representative selects the beacon from the list. The selected beacon may be a pre-existing beacon that has already been configured or a newly added beacon that has not yet been configured. The representative enters the parameters for each such beacon. At step 1214 the representative sets a location. This location may be set, for example, by typing in a label to be added to the record for the beacon or by selecting from a list of existing or planned zones in the store. This information is stored into the configuration file for the beacon.

At step 1216 the user may set the power level of the beacon. As described above beacons interior to the store that delimit zones may have a relatively low transmission power while the beacon, for example, beacon 120a shown in FIG. 1, located near the entrance of the store may have a relatively high transmission power so that the beacon ID may be captured by customers while they are still outside of the store. The power level may be set, for example, by selecting from among a small number of preset values. These values may be identified by their function, for example, in decreasing power order, "Entrance zone," "Single Beacon Zone" and "Multiple Beacon Zone." In the example implementation, each beacon is associated with one zone although one zone may be associated with multiple beacons. Where multiple beacons 120 define a zone, the beacons may be spaced around the zone to provide mobile devices 110 in the zone with an appropriate signal level while providing lower signals outside of the zone. The exact power settings depend on the type of beacon device that is selected and the power source for the beacon. For example, a relatively high-power beacon may be powered from the store's electrical service while a relatively low-power beacon may be battery powered.

At step 1218 the service representative is prompted to add or delete a device or product to be associated with the beacon. This step effectively assigns/removes devices and products in the store to/from the various zones. A device may be added, for example, by scanning its UPC bar code using the camera 654, shown in FIG. 6. Alternatively, a device may be added by selecting from a list. The list may be hierarchical such that different manufacturers are shown at a first level and devices from each manufacturer shown at a lower level. Alternatively, the service representative may type in the name or stock keeping unit (SKU) of the product using the displayed keyboard (not shown) of the tablet POS terminal 140. A device may be deleted by simply removing the record from the configuration table. At step 1220 the process determines whether additional devices are to be added or deleted.

When no more devices are to be added control transfers to step 1222 which allows a customer service representative to add or delete a promotion in the zone. In one example, the promotions are predetermined by the store manager. They may be seasonal items such as e-books or audio players for sale during the summer or back-to-school applications for the fall. They may also be items that are currently not selling well. Promotions may be added or deleted from the beacon configuration table in the same way as the devices, described above. At step 1224 the process determines if there are more promotions if there are control transfers to step 1222 to add the additional promotions.

Once the beacon has been configured the process saves the configuration file to the server 214 at step 1226. At step 1228 the mobile terminal 140 receives, from the geo-fencing application of the server 214, a program file. This program file is used to set the broadcast power level of the beacon and its beacon ID which, in this embodiment includes the UUID, major and minor values. The rest of the information in the configuration file, including the beacon association, is stored in records of the geo-fencing database 902 (shown in FIG. 9) corresponding to the respective beacon ID. This information may also be stored in the POS terminals 140 as respective beacon configuration files, one for each deployed beacon. At step 1230 the point of sale terminal 140 establishes a pairing relationship with the beacon in order to transfer the beacon ID to the beacon. At step 1232 the transfer is complete.

Figures 12, 13:
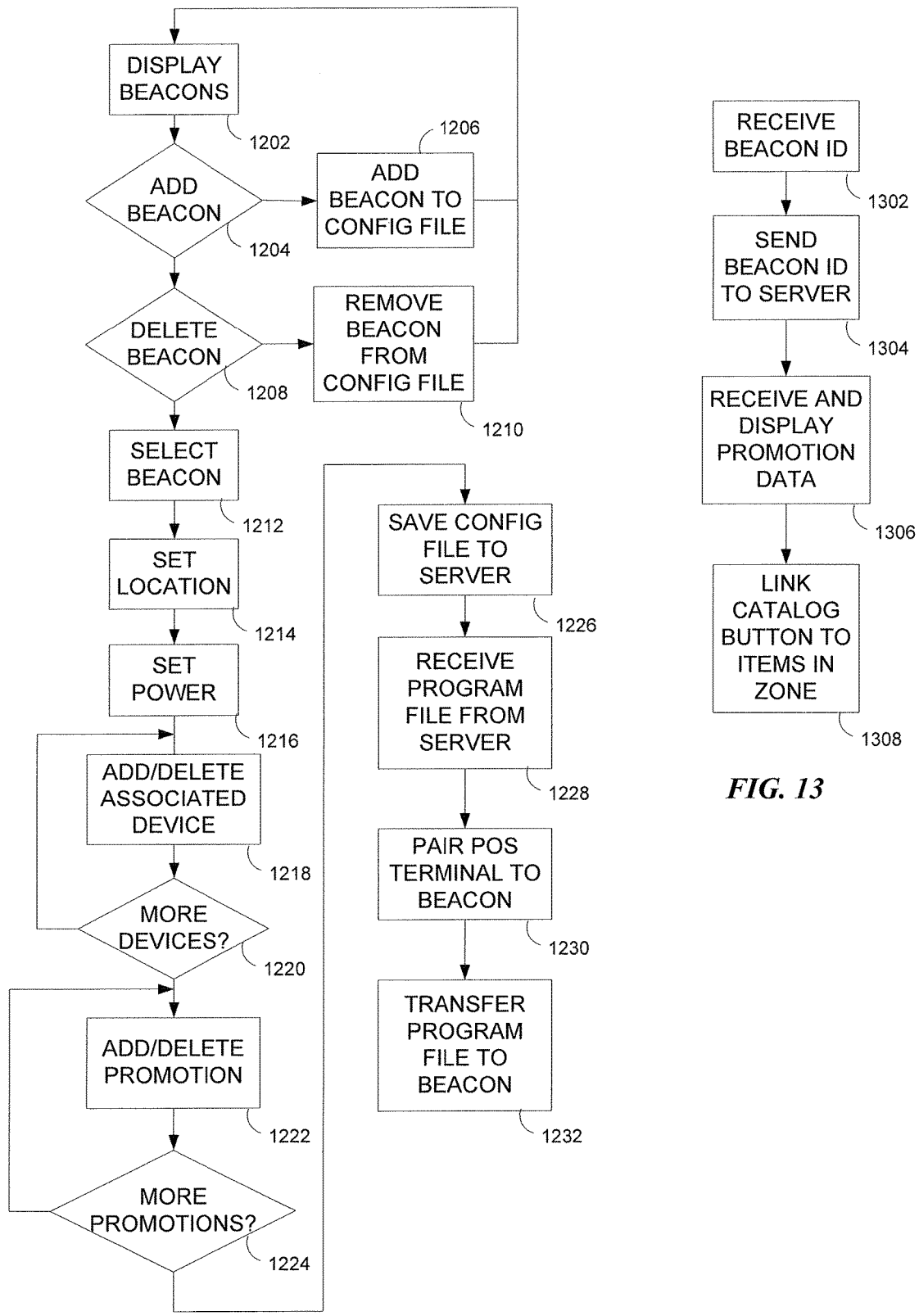
FIG. 12 is a flow diagram showing the processing of the point-of-sale terminal when programming a beacon.
FIG. 13 is a flow diagram illustrating the interaction between a mobile device and a and a beacon.

FIG. 13 is a flow chart diagram illustrating the actions of the mobile device 110 upon sensing a beacon 120. At step 1302 the mobile device receives the beacon ID from the beacon. At step 1304 it transfers the beacon ID to the geo-fencing application 215 of the application server 214. At step 1306 the geo-fencing application 215 responds with promotional data to be displayed using the geo-fencing application 310 on the mobile device 110. Also transferred is a catalogue of items that are in the zone associated with the beacon at step 1308. The information provided to the geo-fencing application on the beacon is in a predetermined format so that the application may display the appropriate soft-keys, data entry fields and images.

Figures 1, 14C:
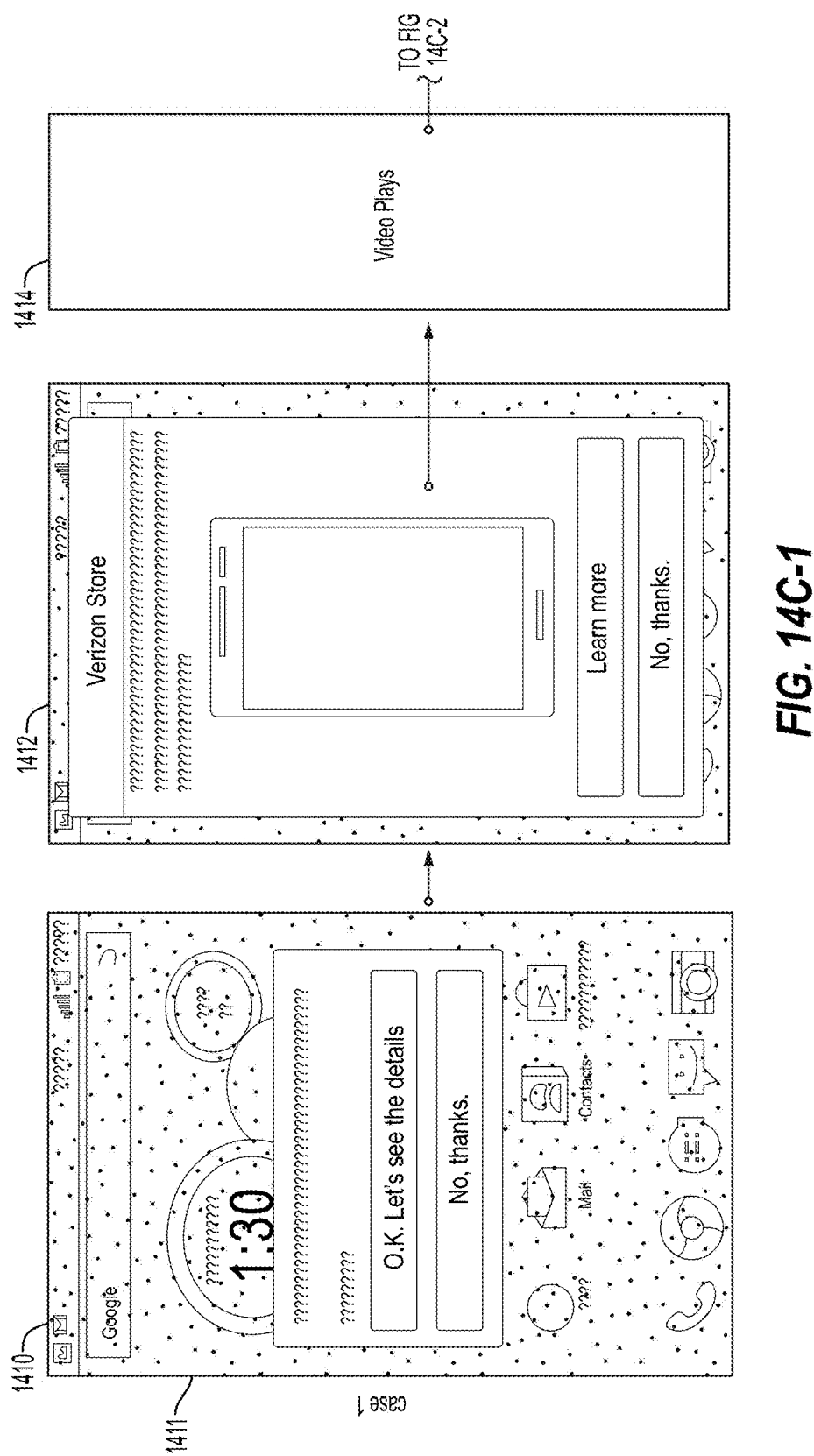
FIGS. 14C, 14D and 14E are flow-diagrams that show the operation of the mobile device moving into and out of a zone and moving between zones.
Figures 2, 14C:
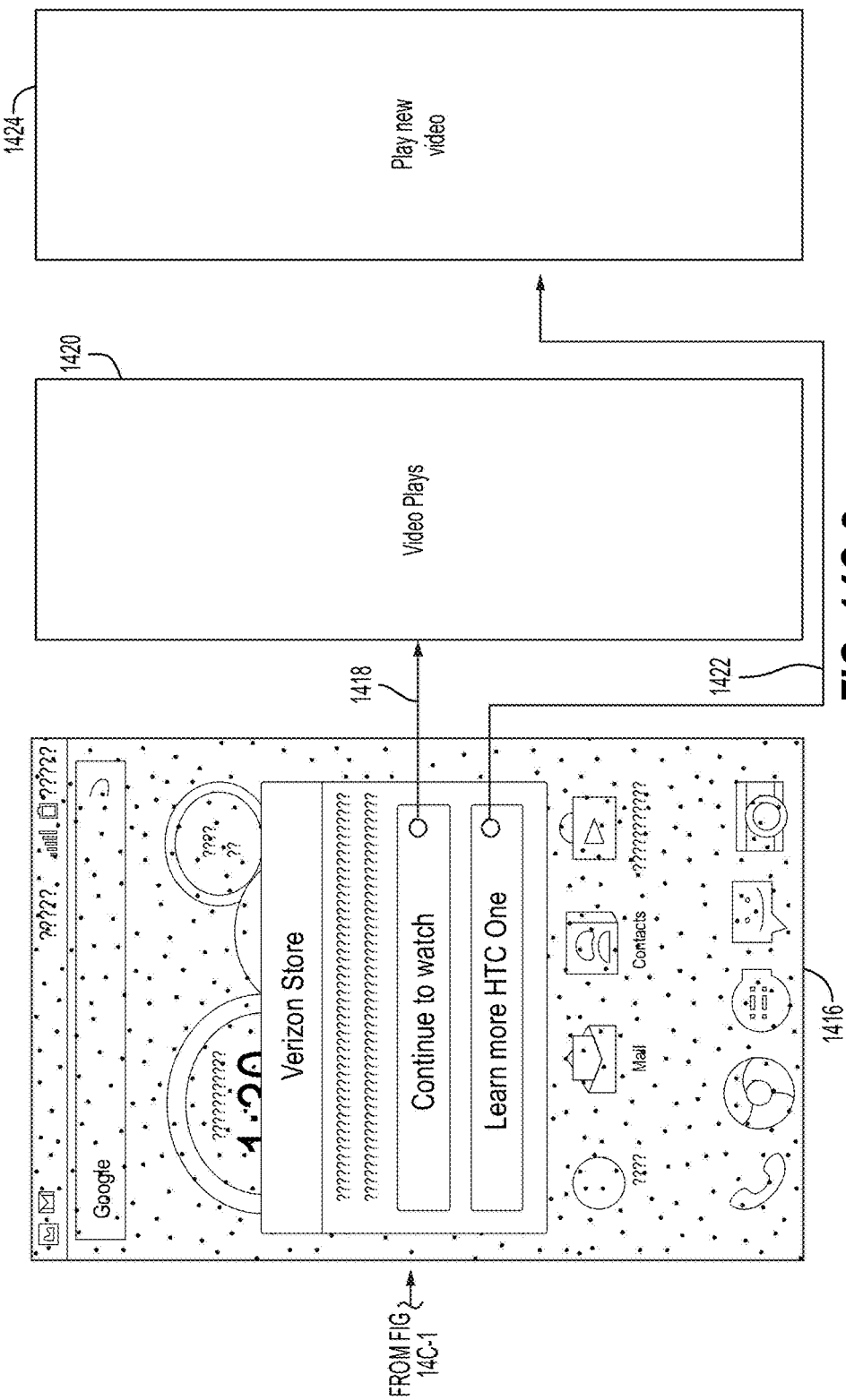
Figures 1, 14D:
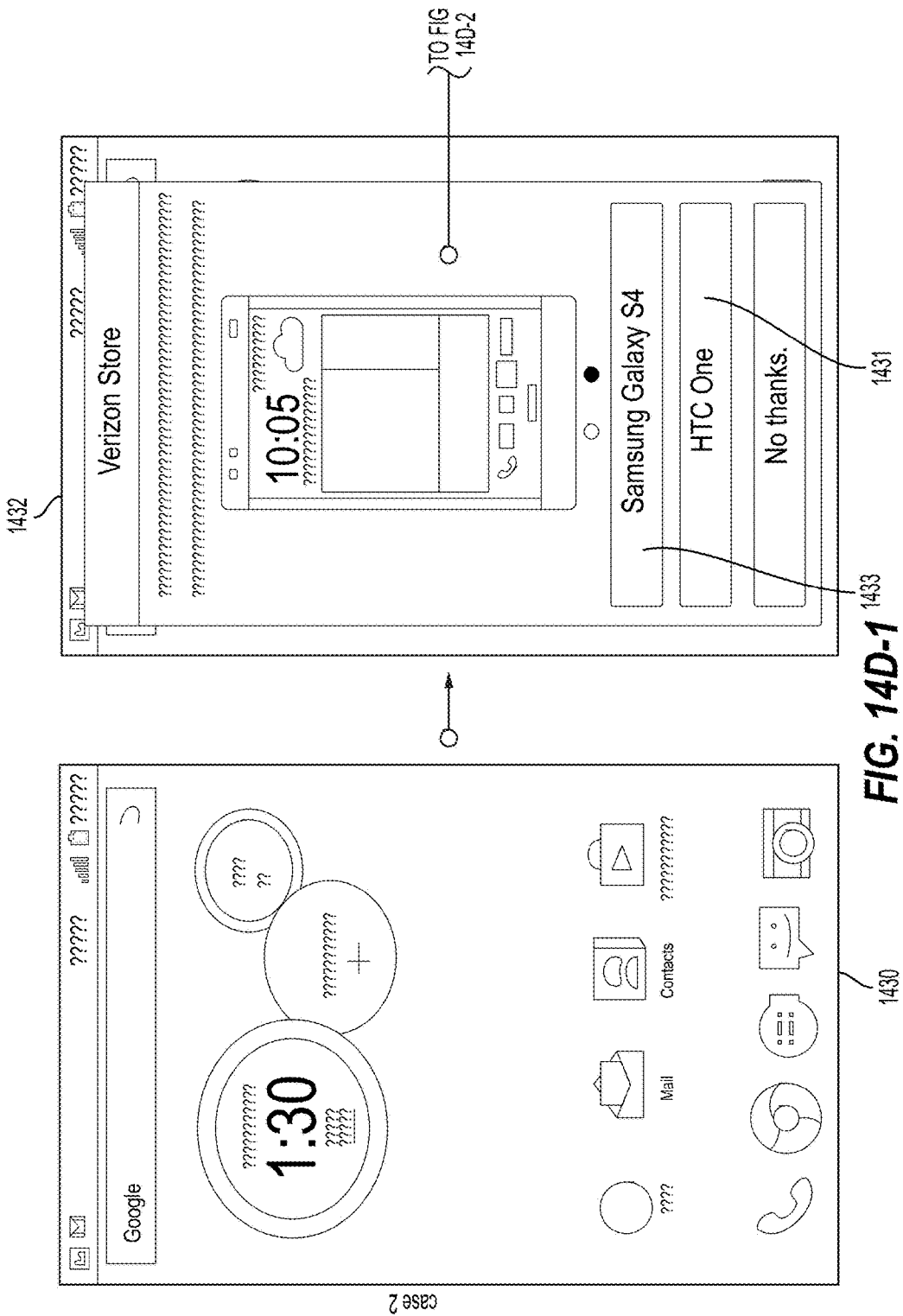
Figures 2, 14D:
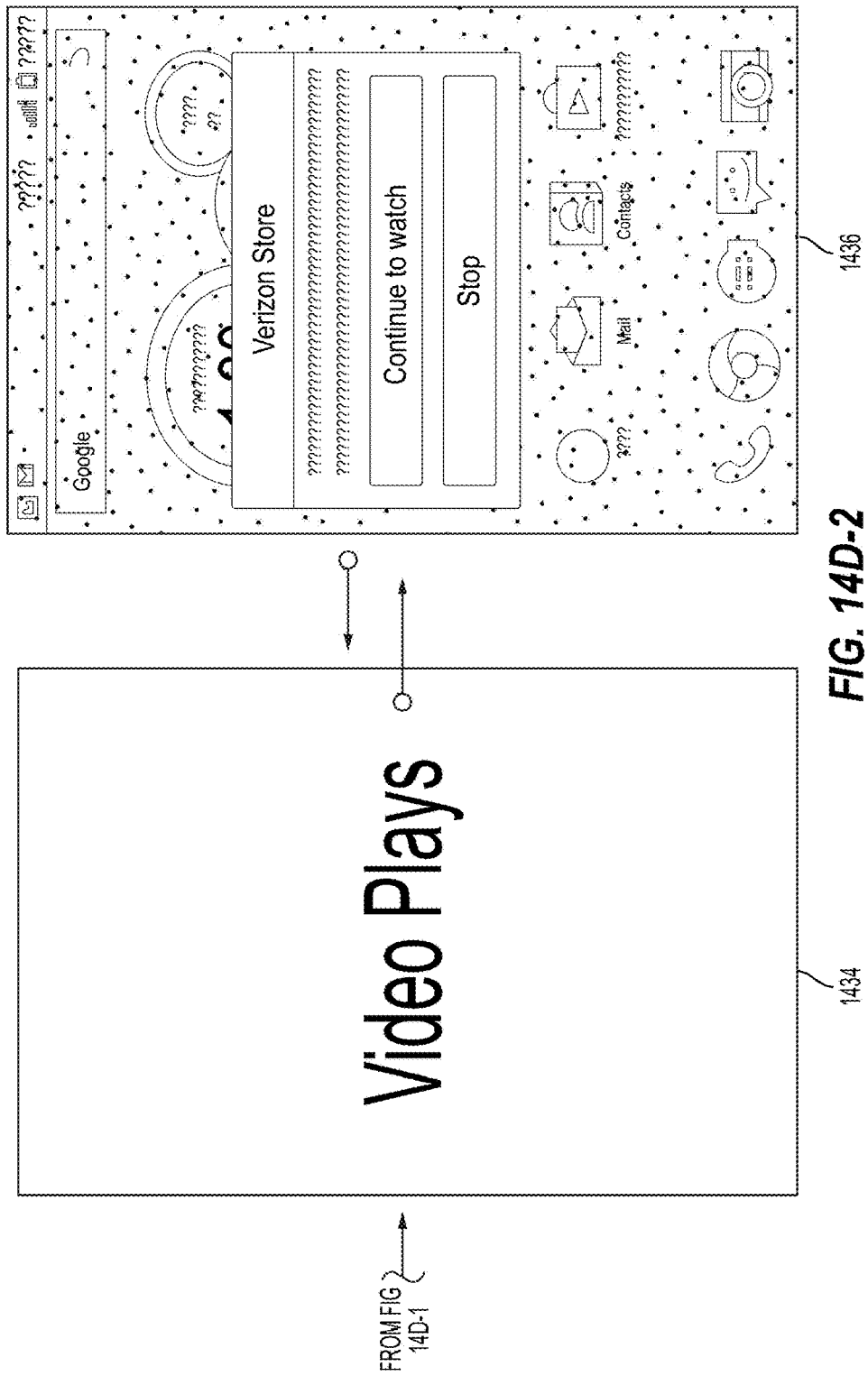

FIGS. 14A and 14B illustrate two case studies, described in more detail in FIGS. 14C and 14D, respectively. These case studies illustrate how the system handles movement from a first zone to a second zone while the customer is engaged in an activity in the first zone.

In the first case study, illustrated by FIG. 14A, a mobile device 110 moves from a zone 1406 defined by a beacon 1408 to a zone 1402 defined by a beacon 1404. As shown in FIG. 14C, when the customer is in zone 1408, the mobile device 110 displays a welcome screen at step 1410. The welcome screen displays a message asking the customer if she would like information on current special offers. The screen also defines soft-keys that allow the customer to either view information about the offers or decline to view the offers. In this case, the customer accepts the offer by pressing the soft-key 1411. Next, the geo-fencing application 215 registers the customer as having activity with zone 1406 and causes the mobile device to display a screen showing the special offer for zone 1406, in this case, a Samsung Galaxy® smart phone. The displayed screen asks the customer if she would like to see more information about the smart phone and provides the customer with two soft-keys, one to view a video about the smart phone and the other to decline. In this example, the customer accepts and the geo-fencing application 215 streams a video about the Samsung smart phone to the mobile device 110, via the wireless network, in step 1414.

At step 1416, the customer, while viewing the video has moved from zone 1406 to zone 1404. This movement causes the mobile device 110 to register the new zone with the geo-fencing application 215. In response to this registration, the application 215 suspends presentation of the video and causes a message to be displayed, asking the customer if she would like to continue viewing the video. The display includes two soft-keys, one to continue and the other to view a video about the special offer in zone 1402, an HTC® smart phone. If the customer wants to continue, she activates the top smart-key at step 1418 and the video about the Samsung smart phone continues at step 1420. If, on the other hand, she wants to stop this video and view the video about the HTC phone, she presses the bottom smart key, at step 1422 the customer has pressed the bottom key and the geo-fencing application 215 terminates the customer's activity with zone 1406 and streams a video about the HTC phone to the mobile device 110 at step 1424.

Special offers for an entire store may be handled in one of two ways. The first way associates the offers only with the entrance zone 101. Thus, any special offers, catalogs or option menus associated with the entire store are presented only to customers registered in the entrance zone 101. Alternatively, the application 310 running on the mobile device 110 may implement a split screen, where a top portion of the screen displays offers and option menus for the entire store, including, for example, the ability to display a catalog of all products in the store. In this example, the bottom portion of the screen displays the offers and option menus for the particular zone in which the mobile device is currently registered.

FIG. 14B illustrates the case where a customer enters zone 1406 and then moves to a location that is not within zone 1406 or 1402. As shown in FIG. 14D, at step 1430, before the customer enters the zone, the mobile device 110 displays the customer's home screen. Upon entering the zone, the geo-fencing application 310 running on the mobile device 110 registers zone 1406 with the geo-fencing application 215 running on the application server 214. This causes the application 215 to display a screen advertising a special offer for zone 1406. In this case, zone 1406 has two special offers, one for the Samsung smart phone and another for the HTC smart phone. The screen displayed at step 1432 allows the customer to select a video about the Samsung smart phone by activating the soft-key 1433 and to view a video about the HTC smart phone by activating the soft-key 1431. The screen also has a third soft-key that allows the customer to decline viewing either video. In this case, the customer selects the video about the Samsung phone. The geo-fencing application registers the customer activity with zone 1406 and displays the requested video in step 1434. In step 1436, the customer has left zone 1406 and the application 310 running on the customer's mobile device 110 has registered the zone change with the geo-fencing application 215. In this instance, at step 1436, the geo-fencing application 215 suspends the video presentation and causes a screen to be displayed asking the customer if she would like to continue viewing the video or stop. Two soft-keys are provided for these options.

Figure 14E:
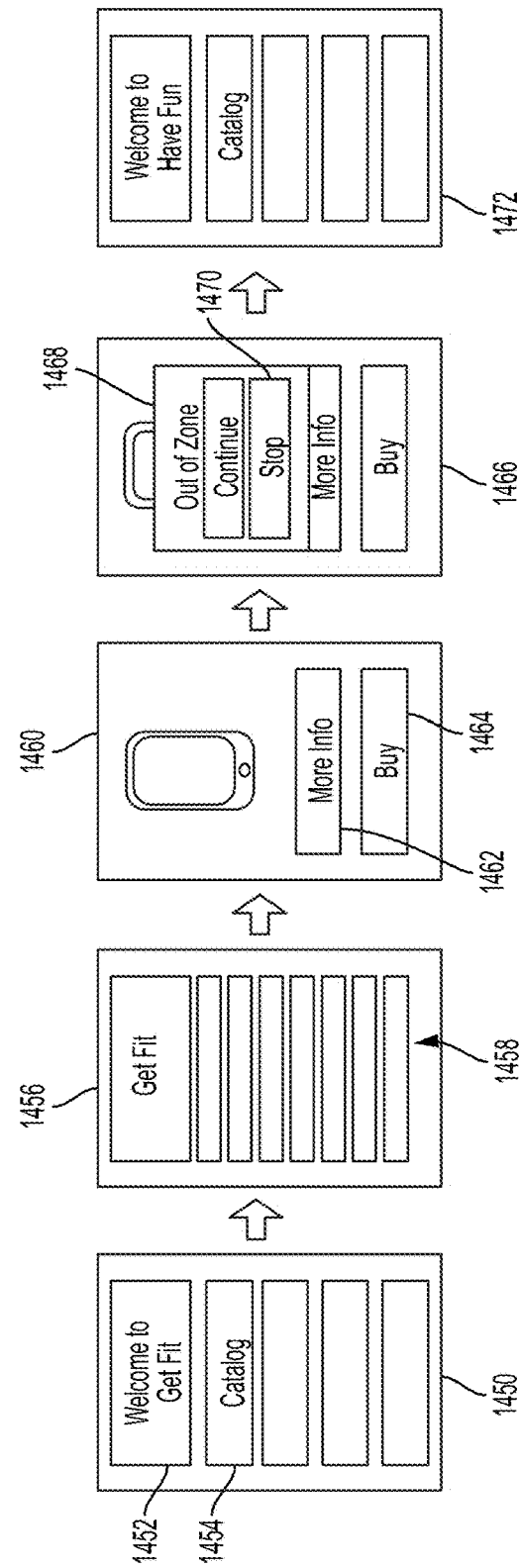

FIG. 14E is another example showing how the system shown in FIG. 1 handles a customer who is engaged with activities in one zone and moves to another zone. At step 1450, the customer has entered the Get Fit zone 108, shown in FIG. 1. As the application 310 senses the zone 108, it registers the zone with the geo-fencing application 215. The application 215 then causes the mobile device to display the screen shown in step 1450. This screen includes a message welcoming the customer to the Zone and several soft-keys allowing the user to engage in activities in the zone. In this instance, one of the soft-keys, 1454, is for a catalog of items in the zone. The customer activates this key and, at step 1456, the application 215 registers the mobile device as having an activity with the Get Fit zone 108 and causes the application 310 to display a list 1458 of items that are available in the Get Fit zone. At step 1460, the customer selects one of the items and, at step 1460, an image of the item is displayed along with two soft-keys, one allowing the customer to request more information and the other allowing the customer to purchase the item. At step 1466, the customer has moved from the Get Fit zone 108 to the Have Fun zone 106.

As described above, when the mobile device moves from one zone to another, the device is automatically registered in the new zone by the geo-fencing application 215 running on the application server 214. When the new zone is registered, the geo-fencing application 215 causes darkens the display of the item, deactivates the soft-keys associated with that display and causes a message to be displayed over the screen from zone 108, informing the customer that she has left the Get Fit zone and asking her if she would like to continue with the activity from the Get Fit zone 108 or receive information about the Have Fun zone 106. The application 310 provides two soft-keys for these options. In this instance, the customer chooses to stop the activity in zone 108 by activating soft-key 1470. At step 1472, the geo-fencing application 215 terminates the activity of the mobile device 110 in the Get Fit zone 108 and causes the geo-fencing application 310 to display the welcome screen from the Have Fun zone 106 on the mobile device 110.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A system comprising:
    a server, coupled to a wireless network, comprising:
        a server application;
        a memory storing instructions; and
        a processor to execute the instructions to:
            receive, from a mobile device via the wireless network, a first beacon identifier of a plurality of unique beacon identifiers and information identifying the mobile device,
                the mobile device comprising a mobile application to interact with the server application;
            register the mobile device as being in a first zone defined by the first beacon identifier;
            send, via the wireless network, a first message to the mobile device that causes the mobile device, via the mobile application, to display a set of options related to the first zone;
            receive, via the wireless network, a first signal from the mobile device indicating a selection, via the mobile application, of one of the set of options;
            cause, based on receiving the first signal, activity of the mobile device related to the first zone;
            receive, from the mobile device and via the wireless network, a second beacon identifier of the plurality of unique beacon identifiers and information identifying the mobile device,
                the second beacon identifier being associated with a strongest beacon signal received at the mobile device, and
                the second beacon identifier defining a second zone different from the first zone;
            register the mobile device as being in the second zone;
            suspend, based on registering the mobile device with the second zone, the activity of the mobile device related to the first zone;
            send, via the wireless network, a second message to the mobile device causing the mobile device to provide for display:
                a first option for continuing the activity of the mobile device related to the first zone, and
                a second option for information regarding the second zone;
            receive a second signal from the mobile device indicating selection of the first option to continue the activity of the mobile device related to the first zone; and
            resume the activity of the mobile device related to the first zone.

2. The system of claim 1, wherein the processor is further to:
    receive a third signal from the mobile device indicating selection of the second option;
    terminate the activity of the mobile device related to the first zone; and send a third message to the mobile device that causes the mobile device to display a further set of options for the second zone.

3. The system of claim 1, further including a point-of-sale (POS) terminal located in a venue and coupled to the server via a wireless local area network (WLAN) and a wireless network, and
wherein the processor is further to:
send information about a user and a zone in which the user is registered to the POS terminal via the WLAN.

4. The system of claim 1, wherein the first zone is an entrance zone and the activity of the mobile device related to the first zone includes an appointment with personnel associated with a venue that was scheduled by a user before entering the venue and, responsive to registering the mobile device in the first zone, and
wherein the processor is further to:
send a reminder message about the appointment to the mobile device and to send a message to a point-of-sale (POS) terminal announcing presence of the user to the personnel associated with the venue.

5. The system of claim 1, wherein the processor, when sending the first message, is to:
send information describing an item available for purchase,
the first message being configured to cause a purchase option to be displayed on the mobile device; and
wherein the processor is further to:
receive from the mobile device a third signal indicating selection of the purchase option to purchase the item;
send, to the mobile device, a request for payment information and an encryption key;
receive, from the mobile device, the payment information encrypted with the encryption key;
decrypt the encrypted payment information to provide decrypted payment information;
transmit the decrypted payment information to a payment processing server;
receive a message from the payment processing server indicating that payment is accepted; and
send a receipt to the mobile device and to a point-of-sale (POS) terminal.

6. The system of claim 5, wherein:
the first message includes an indication to charge the item to a wireless account of a user;
the request for payment information includes a request to sign-in to the wireless account of the user; and
the decrypted payment information includes a username and password for the wireless account of the user.

7. The system of claim 1, wherein the first option includes an option to display a catalog of items available for purchase in the first zone.

8. A non-transitory computer readable medium storing instructions, the instructions comprising:
one or more instructions, that when executed by a processor of a mobile communication device, cause the processor to:
receive a first unique beacon identifier associated with a first zone;
transmit, via a wireless network, the first unique beacon identifier and information identifying the mobile communications device to a server running a server portion of a geo-fencing application,
the server portion to interact with a mobile portion of the geo-fencing application on the mobile communication device;

receive, from the server via the wireless network, a first message,
the first message causing the mobile communication device to provide, for display, a set of options related to the first zone;
receive a signal indicating a selection, via the mobile portion, of one of the set of options;
transmit, via the wireless network, the signal indicating the selection to the server;
receive, via the wireless network and from the server, information associated with the first zone;
receive a second unique beacon identifier associated with a second zone,
the second unique beacon identifier being associated with a strongest beacon signal received at the mobile communication device;
transmit, via the wireless network, the second unique beacon identifier to the server;
receive, via the wireless network, a second message from the server,
the second message causing receipt of the information associated with the first zone to be suspended and causing the mobile communication device to provide for display:
a first option to continue to receive the information associated with the first zone, and
a second option for information regarding the second zone;
receive a first selection of the first option to continue to receive the information associated with the first zone or a second selection of the second option for the information regarding the second zone; and
selectively:
resume receiving the information associated with the first zone based on receiving the first selection, or
receive the information regarding the second zone based on receiving the second selection.

9. The non-transitory computer readable medium of claim 8, wherein the first zone is an entrance zone and the set of options includes an option for signing in to at least one of:
an appointment,
a workshop, or
an in-store pickup arrangement.

10. The non-transitory computer readable medium of claim 8, wherein the one or more instructions, when executed by the processor, further cause the processor to:
receive identifying information about an object from a sensor of the mobile communications device;
transmit the identifying information to the server;
receive, from the server, information concerning the object;
receive a request to purchase the object;
transmit the request to purchase the object to the server;
receive, from the server, a request to provide payment information;
transmit the payment information to the server; and
receive a receipt from the server confirming purchase of the object.

11. The non-transitory computer readable medium of claim 8, wherein the one or more instructions, when executed by the processor, further cause the processor to:
transmit payment information to the server to charge a purchase to a mobile communications account associated with the mobile communications device.

12. The non-transitory computer readable medium of claim 8, wherein the signal is a first signal; and wherein the one or more instructions, when executed by the processor, further cause the processor to:
transmit, based on receiving the first selection, a second signal to the server via the wireless network; and
receive, from the server and based on transmitting the second signal, additional information associated with the first zone.

13. The non-transitory computer readable medium of claim 8, wherein the signal is a first signal; and
wherein the one or more instructions, when executed by the processor, further cause the processor to:
transmit, based on receiving the second selection, a second signal to the server via the wireless network; and
receive, based on transmitting the second signal and from the server, a third message,
the third message causing display of a set of options for the second zone.

14. A method comprising:
receiving, by a mobile communications device, a first unique beacon identifier associated with a first zone of a venue,
the mobile communications device comprising a mobile application;
transmitting, by the mobile communications device and via a wireless network, the first unique beacon identifier and information concerning the mobile communications device to a server,
the server comprising a server application to interact with the mobile application;
receiving, by the mobile communications device from the server via the wireless network, a first message,
the first message causing the mobile communications device to provide, for display, a set of options related to the first zone;
receiving, by the mobile communications device, an input indicating a selection, via the mobile application, of one of the set of options;
transmitting, by the mobile communications device and via the wireless network, a signal indicating the selection to the server;
receiving, by the mobile communications device from the server via the wireless network, information associated with the first zone;
receiving, by the mobile communications device, a second unique beacon identifier associated with a second zone,
the second unique beacon identifier being associated with a strongest beacon signal;
transmitting, by the mobile communications device and via the wireless network, the second unique beacon identifier to the server;
receiving, by the mobile communications device and via the wireless network, a second message from the server,
the second message causing receipt of the information associated with the first zone to be suspended and causing the mobile communications device to provide for display:
a first option to continue to receive the information associated with the first zone, and
a second option for information regarding the second zone;
receiving, by the mobile communications device, a first selection of the first option to continue to receive the information associated with the first zone or a second selection of the second option for the information regarding the second zone; and
selectively:
resuming, by the mobile communications device, receipt of the information associated with the first zone based on receiving the first selection, or
receiving, by the mobile communications device, the information regarding the second zone based on receiving the second selection.

15. The method of claim 14, wherein a touch-screen overlays a display of the mobile communications device, and
wherein the method further comprises:
defining a plurality of soft-keys representing a set of options,
the set of options including the first option and the second option;
receiving, via the touch-screen, an indication that one of the soft-keys has been activated;
sending, via the wireless network, a message to the server indicating that the one of the soft-keys has been activated to indicate a selection of an option of the set of options; and
receiving a message from the server indicating that personnel associated with the venue have been notified of an interaction represented by the one of the soft-keys.

16. The method of claim 15, wherein the venue is a retail store and the soft-keys include a scan-and-purchase soft-button, and
wherein the method further comprises:
receiving, via the touch-screen, an indication that the scan-and-purchase soft button has been pressed;
processing data captured by sensors of the mobile communication device identifying a product based on receiving the indication;
transmitting the data to the server;
receiving, from the server, information about the product;
providing, for display, the information and a purchase soft-button to request purchase of an item;
receiving, via the touch screen, an indication that the purchase soft button has been activated;
transmitting a purchase request to the server;
receiving, from the server, a request for payment information;
sending the payment information to the server; and
receiving a receipt from the server.

17. The method of claim 16, wherein the request for payment information includes an encryption key;
wherein the method further comprises:
encrypting the payment information; and
wherein sending the payment information to the server comprises:
sending the encrypted payment information to the server.

18. The method of claim 16, wherein the request for payment information includes a request for log-in information for a wireless network payment server;
wherein the method further comprises:
encrypting the log-in information using an encryption key; and
wherein sending the payment information to the server comprises:
sending the encrypted log-in information to the server.

19. The method of claim 16, wherein the request for payment information a request for credit card information;

wherein the method further comprises:
  encrypting a credit card number; and
wherein sending the payment information to the server comprises:
  sending the encrypted credit card number to the server.

* * * * *